United States Patent
Koch et al.

(10) Patent No.: US 11,544,972 B1
(45) Date of Patent: Jan. 3, 2023

(54) SYSTEMS AND METHODS FOR DIAGNOSTIC TOOL DETECTION IN A TELEMATICS DEVICE

(71) Applicant: Geotab Inc., Oakville (CA)

(72) Inventors: Alexander K. Koch, Guleph (CA); Artur Gyumushyan, Richmond Hill (CA); Siam Ahmed, Burlington (CA); Anthonios Partheniou, Ancaster (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 17/842,903

(22) Filed: Jun. 17, 2022

Related U.S. Application Data

(60) Provisional application No. 63/334,331, filed on Apr. 25, 2022.

(51) Int. Cl.
*G07C 5/00* (2006.01)
*H04L 12/40* (2006.01)
*G06Q 50/30* (2012.01)

(52) U.S. Cl.
CPC ............. *G07C 5/008* (2013.01); *G06Q 50/30* (2013.01); *H04L 12/40* (2013.01); *H04L 2012/40215* (2013.01); *H04L 2012/40273* (2013.01)

(58) Field of Classification Search
CPC ........ G07C 5/008; G06Q 50/30; H04L 12/40; H04L 2012/40215; H04L 2012/40273
USPC ...................................................... 701/31.5
See application file for complete search history.

(56) References Cited

U.S. PATENT DOCUMENTS

| | | | |
|---|---|---|---|
| 8,214,313 B1* | 7/2012 | Puskorius | G06Q 10/087 706/28 |
| 9,984,561 B1 | 5/2018 | Swafford | |
| 10,878,704 B2* | 12/2020 | Nahle | G08G 1/207 |
| 10,970,676 B2* | 4/2021 | Simmons | G07C 9/27 |
| 11,076,258 B2* | 7/2021 | Brady | H04W 4/029 |
| 11,308,737 B1* | 4/2022 | Smith | G07C 5/085 |

(Continued)

FOREIGN PATENT DOCUMENTS

| | | | | |
|---|---|---|---|---|
| CN | 103929830 A | * | 7/2014 | ............. G06F 17/00 |
| CN | 105094112 A | * | 11/2015 | ........ H04W 52/0241 |
| CN | 109842862 A | * | 6/2019 | ......... H04L 63/0823 |

OTHER PUBLICATIONS

Mathias et al., "Relaying Controller Area Network Frames over Wireless Internetworks for Automotive Testing Applications," 2009, Publisher: IEEE.*

(Continued)

*Primary Examiner* — Tuan C To
(74) *Attorney, Agent, or Firm* — Sherif A. Abdel-Kader

(57) ABSTRACT

Methods and systems of enabling a non-interfering mode in a telematics device are provided. In one aspect, a method includes receiving a co-presence policy from a telematics server, receiving asset data from the asset, determining a presence of a second device on the asset communications bus based on the co-presence policy, and activating a non-interfering mode of operation based on determining the presence of the second device and on the co-presence policy. The method may be used to prevent interference between a telematics device and a diagnostic tool connected to the same vehicle communications bus. Advantageously, tasks such as reading diagnostic trouble codes and firmware updates are not disrupted.

16 Claims, 16 Drawing Sheets

(56) References Cited

U.S. PATENT DOCUMENTS

| | | | |
|---|---|---|---|
| 2004/0267410 A1* | 12/2004 | Duri | H04L 63/20 |
| | | | 701/1 |
| 2006/0095174 A1* | 5/2006 | Sonnenrein | B60R 16/02 |
| | | | 701/31.5 |
| 2006/0122746 A1* | 6/2006 | Gawlik | G06F 8/65 |
| | | | 701/33.7 |
| 2010/0153207 A1 | 6/2010 | Roberts | |
| 2015/0100197 A1 | 4/2015 | Peirce | |
| 2016/0096508 A1 | 4/2016 | Oz | |
| 2016/0099806 A1 | 4/2016 | Racklyeft | |
| 2017/0327080 A1* | 11/2017 | Weinfurther | B60R 25/1001 |
| 2018/0124244 A1 | 5/2018 | Lee | |
| 2019/0124477 A1* | 4/2019 | Shipley | G06Q 10/10 |
| 2019/0156592 A1* | 5/2019 | Miller | G07C 5/008 |
| 2020/0184404 A1* | 6/2020 | Mezaael | H04L 9/3239 |
| 2020/0334989 A1* | 10/2020 | Nahle | G05D 1/0088 |
| 2021/0022068 A1* | 1/2021 | Ayoub | H04W 88/06 |
| 2021/0225093 A1 | 7/2021 | Hergesheimer | |
| 2021/0256782 A1 | 8/2021 | Ehlers | |
| 2021/0266193 A1 | 8/2021 | Bijjala | |
| 2021/0271962 A1* | 9/2021 | Abhishek | G06F 17/18 |
| 2021/0272392 A1* | 9/2021 | Erdelyi | G07C 5/0841 |

OTHER PUBLICATIONS

Abenezer et al., "Driver Identification Based on Vehicle Telematics Data using LSTM-Recurrent Neural Network," 2019, Publisher: IEEE.*

\* cited by examiner

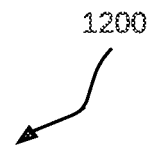

| Sensitivity Level | Description |
|---|---|
| 1201 (Sensitive) | Check for CAN ID not typically used in broadcast CAN frames |
| 1202 | Check for specific CAN IDs known to be used by tools |
| 1203 | Check for a specific CAN ID and a corresponding vehicle type |
| 1204 | Check for specific CAN IDs known to be used by tools and verify transport |
| 1205 (Strict) | Check CAN identifier, transport, and specific diagnostic protocol messages |

Figure 12

| Tool Status | Motion status | Priority | Action |
|---|---|---|---|
| Temporary | X | Prioritize telematics device always | Telematics device operates normally (with some exceptions) |
| Temporary | X | Prioritize temporary tool always | Telematics device goes into non-interfering mode |
| Temporary | Stationary | Prioritize temporary tool if vehicle is stationary | Telematics device goes into non-interfering mode |
| Temporary | Moving | Prioritize telematics device if vehicle is stationary | Telematics device operates normally |
| Permanent | Stationary | Prioritize permanent device Device if vehicle is stationary | Telematics device goes into non-interfering mode |
| Permanent | Moving | Prioritize Telematics Device if vehicle is moving | Telematics device operates normally |
| Permanent | Stationary | Prioritize telematics device if vehicle is moving | Telematics device operates normally |
| Permanent | Moving | Prioritize permanent tool if vehicle is moving | Telematics device goes into non-interfering mode |

Figure 13

SYSTEMS AND METHODS FOR DIAGNOSTIC TOOL DETECTION IN A TELEMATICS DEVICE

FIELD

The present disclosure relates generally to vehicle telematics, and more specifically to systems and methods for diagnostic tool detection in a telematics device.

BACKGROUND

A telematics system may gather asset data using a telematics device. The telematics device may be integrated into or located onboard the asset. The asset may be a vehicle ("vehicular asset") or some stationary equipment. The telematics device may collect the asset data from the asset through a data connection with the asset. In the case of a vehicular asset, the telematics device may gather the asset data through an onboard diagnostic port (OBD). The gathered asset data may include engine revolutions-per-minute (RPM), battery voltage, fuel level, tire pressure, oil temperature, or any other asset data available through the diagnostic port. Additionally, the telematics device may gather sensor data pertaining to the asset via sensors on the telematics device. For example, the telematics device may have temperature and pressure sensors, inertial measurement units (IMU), optical sensors, and the like. Furthermore, the telematics device may gather location data pertaining to the asset from a location module on the telematics device. When the telematics device is coupled to the asset, the gathered sensor data and location data pertain to the asset. The gathered asset data, sensor data and location data may be received and recorded by a technical infrastructure of the telematics system, such as a telematics server, and used in the provision of fleet management tools, for telematics services, or for further data analysis.

SUMMARY

In one aspect of the present disclosure, there is provided a method by a first device connected to an asset communications bus of an asset. The method comprises receiving a co-presence policy from a telematics server, receiving asset data from the asset, determining a presence of a second device on the asset communications bus based on the co-presence policy, and activating a non-interfering mode of operation based on determining the presence of the second device and on the co-presence policy.

The co-presence policy may comprise a sensitivity level.

Receiving asset data may comprise receiving at least one Controller Area Network (CAN) frame from the asset.

Determining the presence of the second device may comprise checking for at least one identifier in the CAN frame in accordance with the sensitivity level.

Checking for at least one identifier in the CAN frame may comprise checking for a CAN identifier that is not a typical broadcast CAN ID.

Checking for at least one identifier in the CAN frame may comprise checking for one of a plurality of CAN frames known to be used by diagnostic tools.

Checking for at least one identifier in the CAN frame may comprise checking for a specific CAN identifier used by a diagnostic tool corresponding to a specific asset type, and the method may further comprise determining that the asset to which the first device is coupled is of the specific asset type.

Determining the presence of the second device may comprise checking for at least one identifier in the CAN frame in accordance with the sensitivity level and detecting a transport frame within the CAN frame.

Determining the presence of the second device may further comprise. detecting at least one diagnostic message within the transport frame.

The at least one diagnostic message may comprise a unified diagnostic services (UDS) message selected from the group consisting of: a session control service and a tester present service.

The co-presence policy may comprise at least one non-interfering mode configuration rule.

The at least one non-interfering mode configuration rule may trigger an action that causes the telematics device to operate normally or to enter a non-interfering mode based on at least one of a tool status, a motion status and a priority.

The tool status may indicate whether the presence of the second device on the asset communications bus is temporary or permanent.

The motion status may indicate whether the asset is stationary or moving.

The priority may determine whether the first device should be prioritized over the second device, or the second device should be prioritized over the first device.

The priority may be based on at least one of the tool status and the motion status.

The non-interfering mode of operation may comprise a requests-blocked mode in which the first device refrains from sending requests on the asset communications bus.

The method may further comprise exiting the non-interfering mode of operation in response to not determining the presence of the second device on the asset communications bus for a predetermined duration.

In another aspect of the present disclosure, there is provided a telematics system comprising a telematics device, a telematics server, and an administration terminal. The method comprises the telematics server receiving a first co-presence policy from the administration terminal, the telematics server receiving at least one of a vehicle type and a vehicle identifier from the telematics device, the telematics server preparing a second co-presence policy based on the first co-presence policy and the at least one of the vehicle type and the vehicle identifier, the telematics server sending the second co-presence policy to the telematics device, the telematics device determining a presence of a second device on an asset communications bus to which the telematics device is coupled, in accordance with the co-presence policy, and the telematics device enabling a non-interfering mode in accordance with the second co-presence policy.

The telematics server may derive the second co-presence policy from the first co-presence policy based on at least one of the vehicle type and the vehicle identifier.

BRIEF DESCRIPTION OF THE DRAWINGS

Exemplary non-limiting embodiments of the present invention are described with reference to the accompanying drawings in which:

FIG. 12 is a table showing a plurality of diagnostic tool detection sensitivity levels, in accordance with embodiments of the present disclosure;

FIG. 13 is a table showing a plurality of non-interfering mode configuration rules, in accordance with embodiments of the present disclosure;

DETAILED DESCRIPTION

Telematics System

Figure 1:
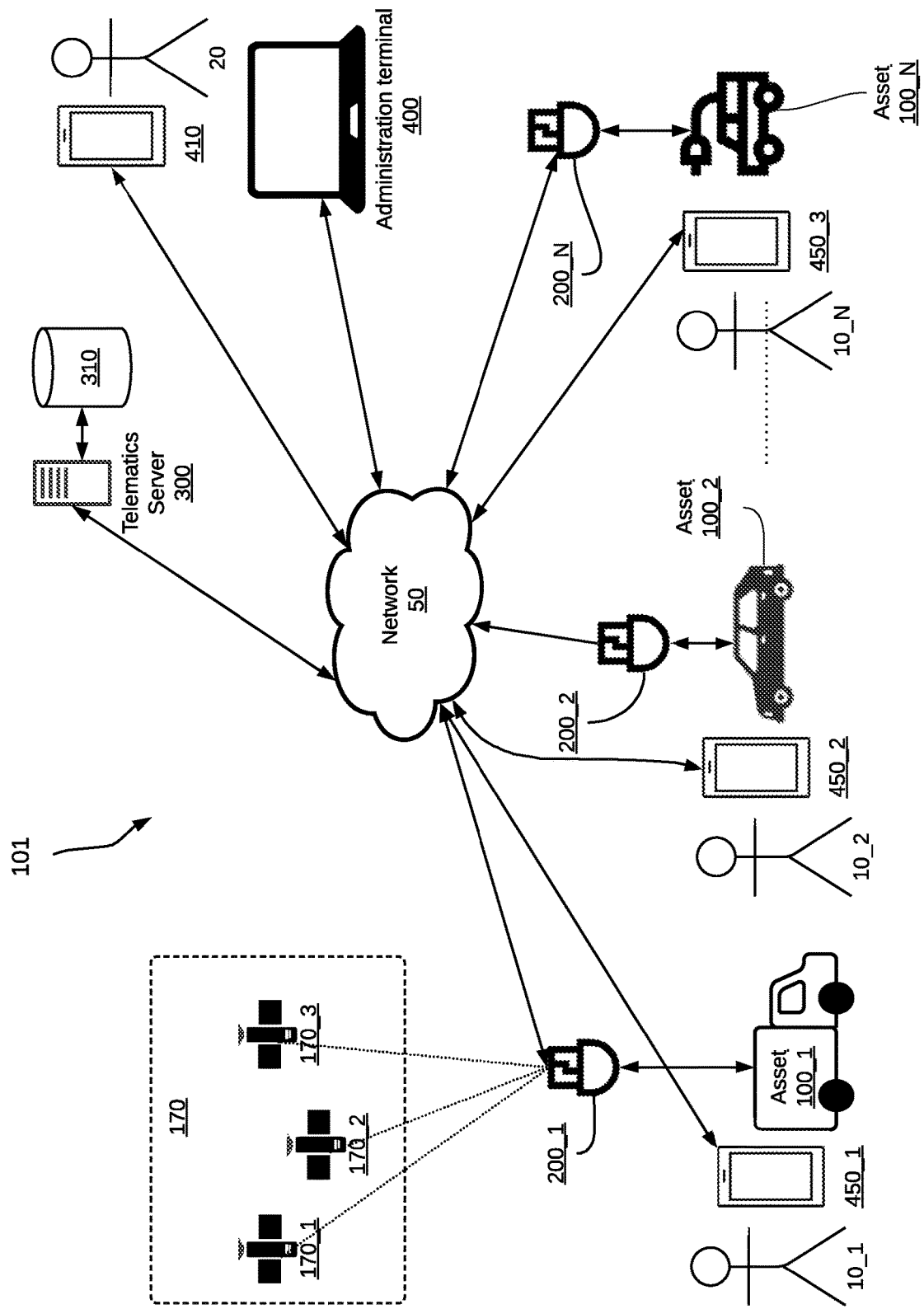
FIG. 1 is a schematic diagram of a telematics system including a plurality of telematics devices coupled to a plurality of assets.

A large telematics system may collect data from a high number of assets, either directly or through telematic devices. A telematics device may refer to a self-contained device installed at an asset, or a telematics device that is integrated into the asset itself. In either case, it may be said that telematics data is being captured or gathered by the telematics device. FIG. 1 shows a high-level block diagram of a telematics system 101. The telematics system 101 includes a telematics server 300, (N) telematics devices shown as telematics device 200_1, telematics device 200_2 . . . through telematics device 200_N ("telematics device 200"), a network 50, administration terminals 400_1 and 400_2, and operator terminals 450_1, 450_2 . . . through 450_N ("operator terminals 450"). FIG. 1 also shows a plurality of (N) assets named as asset 100_1, asset 100_2 . . . asset 100_N ("asset 100") coupled to the telematics device 200_1, telematics device 200_2 . . . telematics device 200_N, respectively. Additionally, FIG. 1 shows a plurality of satellites 170_1, 170_2 and 170_3 ("satellites 170") in communication with the telematics devices 200 for facilitating navigation.

The assets 100 shown are in the form of vehicles. For example, the asset 100_1 is shown as a truck, which may be part of a fleet that delivers goods or provides services. The asset 100_2 is shown as a passenger car that typically runs on an internal combustion engine (ICE). The asset 100_3 is shown as an electric vehicle (EV). Other types of vehicles, which are not shown, are also contemplated in the various embodiments of the present disclosure, including but not limited to, farming vehicles, construction vehicles, military vehicles, and the like.

The telematics devices 200 are electronic devices which are coupled to assets 100 and configured to capture asset data from the assets 100, and transmit the gathered data to a remote server for analysis. For example, in FIG. 1 the telematics device 200_1 is coupled to the asset 100_1. Similarly, the telematics device 200_2 is coupled to the asset 100_2 and the telematics device 200_3 is coupled to the asset 100_3. The components of a telematics device 200 are explained in further detail with reference to FIG. 2.

The network 50 may be a single network or a combination of networks such as a data cellular network, the Internet, and other network technologies. The network 50 may provide connectivity between the telematics devices 200 and the telematics server 300, between the administration terminal 400 and the telematics server 300, between the handheld administration terminal 410 and the telematics server 300, and between the operator terminals 450 and the telematics server 300.

The telematics server 300 is an electronic device executing machine-executable programming instructions which enable the telematics server 300 to store and analyze telematics data. The telematics server 300 may be a single computer system or a cluster of computers. The telematics server 300 may be running an operating system such as Linux, Windows, Unix, or any other equivalent operating system. Alternatively, the telematics server 300 may be a software component hosted on a cloud service, such as Amazon Web Service (AWS). The telematics server 300 is connected to the network 50 and may receive telematics data from the telematics devices 200. The telematics server 300 may have a plurality of software modules for performing data analysis and analytics on the telematics data to obtain useful asset information about the assets 100. The telematics server 300 may be coupled to a telematics database 310 for storing telematics data and/or the results of the analytics which are related to the assets 100. The asset information stored may include operator information about the operators 10 corresponding to the assets. The telematics server 300 may communicate the asset data and/or the operator information pertaining to an asset 100 to one or more of: the administration terminal 400, the handheld administration terminal 410, and the operator terminal 450.

The satellites 170 may be part of a global navigation satellite system (GNSS) and may provide location information to the telematics devices 200. The location information may be processed by a location module on the telematics device 200 to provide location data indicating the location of the telematics device 200 (and hence the location of the asset 100 coupled thereto). A telematics device 200 that can periodically report an asset's location is often termed an "asset tracking device".

The administration terminal 400 is an electronic device, which may be used to connect to the telematics server 300 to retrieve data and analytics related to one or more assets 100 or to issue commands to one or more telematics device 200 via the telematics server 300. The administration terminal 400 may be a desktop computer, a laptop computer such as the administration terminal 400, a tablet (not shown), or a smartphone such as the handheld administration terminal 410. The administration terminal 400 may run a web browser or a custom application which allows retrieving data and analytics, pertaining to one or more assets 100, from the telematics server 300 via a web interface of the telematics server 300. The handheld administration terminal 410 may run a mobile application for communicating with the telematics server 300, the mobile application allowing retrieving data and analytics therefrom. The mobile application of the handheld administration terminal may also be used to issue commands to one or more telematics device 200 via the telematics server 300. A fleet manager 20 may communicate with the telematics server 300 using the administration terminal 400, the handheld administration terminal 410, or another form of administration terminals such as a tablet. In addition to retrieving data and analytics, the administration terminal 400 allows the fleet manager 20 to set alerts and geofences for keeping track of the assets 100, receiving notifications of deliveries, and so on.

The operator terminals 450 are electronic devices, such as smartphones or tablets. The operator terminals 450 are used by operators 10 (for example, vehicle drivers) of the assets 100 to both track and configure the usage of the assets 100. For example, as shown in FIG. 1, the operator 10_1 has the operator terminal 450_1, the operator 10_2 has the operator terminal 450_2, and the operator 10_N has the operator terminal 450_N. Assuming the operators 10 all belong to a fleet of vehicles, each of the operators 10 may operate any of the assets 100. For example, FIG. 1 shows that the operator 10_1 is associated with the asset 100_1, the operator 10_2 is associated with the asset 100_2, and the operator 10_N is associated with the asset 100_N. However, any operator 10 may operate any asset 100 within a particular group of assets, such as a fleet. The operator terminals 450 are in communication with the telematics server 300 over the network 50. The operator terminals 450 may run at least one asset configuration application. The asset configuration application may be used by an operator 10 to inform the telematics server 300 that the asset 100 is being currently operated by the operator 10. For example, the operator 10_2 may use an asset configuration application on the operator terminal 450_2 to indicate that the operator 10_2 is currently using the asset 100_2. The telematics server 300 updates the telematics database 310 to indicate that the asset 100_2 is currently associated with the operator 10_2. Additionally, the asset configuration application may be used to report information related to the operation duration of the vehicle, the number of stops made by the operator during their working shift, and so on. Furthermore, the asset configuration application may allow the operator to configure the telematics device 200 coupled to the asset 100 that the operator 10 is operating.

In operation, a telematics device 200 is coupled to an asset 100 to capture asset data. The asset data may be combined with location data obtained by the telematics device 200 from a location module in communication with the satellites 170 and/or sensor data gathered from sensors in the telematics device 200 or another device coupled to the telematics device 200. The combined asset data, location data, and sensor data may be termed "telematics data". The telematics device 200 sends the telematics data, to the telematics server 300 over the network 50. The telematics server 300 may process, aggregate, and analyze the telematics data to generate asset information pertaining to the assets 100 or to a fleet of assets. The telematics server 300 may store the telematics data and/or the generated asset information in the telematics database 310. The administration terminal 400 may connect to the telematics server 300, over the network 50, to access the generated asset information. Alternatively, the telematics server 300 may push the generated asset information to the administration terminal 400. Additionally, the operators 10, using their operator terminals 450, may indicate to the telematics server 300 which assets 100 they are associated with. The telematics server 300 updates the telematics database 310 accordingly to associate the operator 10 with the asset 100. Furthermore, the telematics server 300 may provide additional analytics related to the operators 10 including work time, location, and operating parameters. For example, for vehicle assets, the telematics data may include turning, speeding, and braking information. The telematics server 300 can correlate the telematics data to the vehicle's driver by querying the asset database 310. A fleet manager 20 may use the administration terminal 400 to set alerts for certain activities pertaining to the assets 100. When criteria for an alert is met, the telematics server 300 sends a message to the fleet manager's administration terminal 400, and may optionally send alerts to the operator terminal 450 to notify an operator 10 of the alert. For example, a vehicle driver operating the vehicle outside of a service area or hours of service may receive an alert on their operator terminal 450. A fleet manager 20 may also the administration terminal 400 to configure a telematics device 200 by issuing commands thereto via the telematics server 300.

Telematics Device

Figure 2:
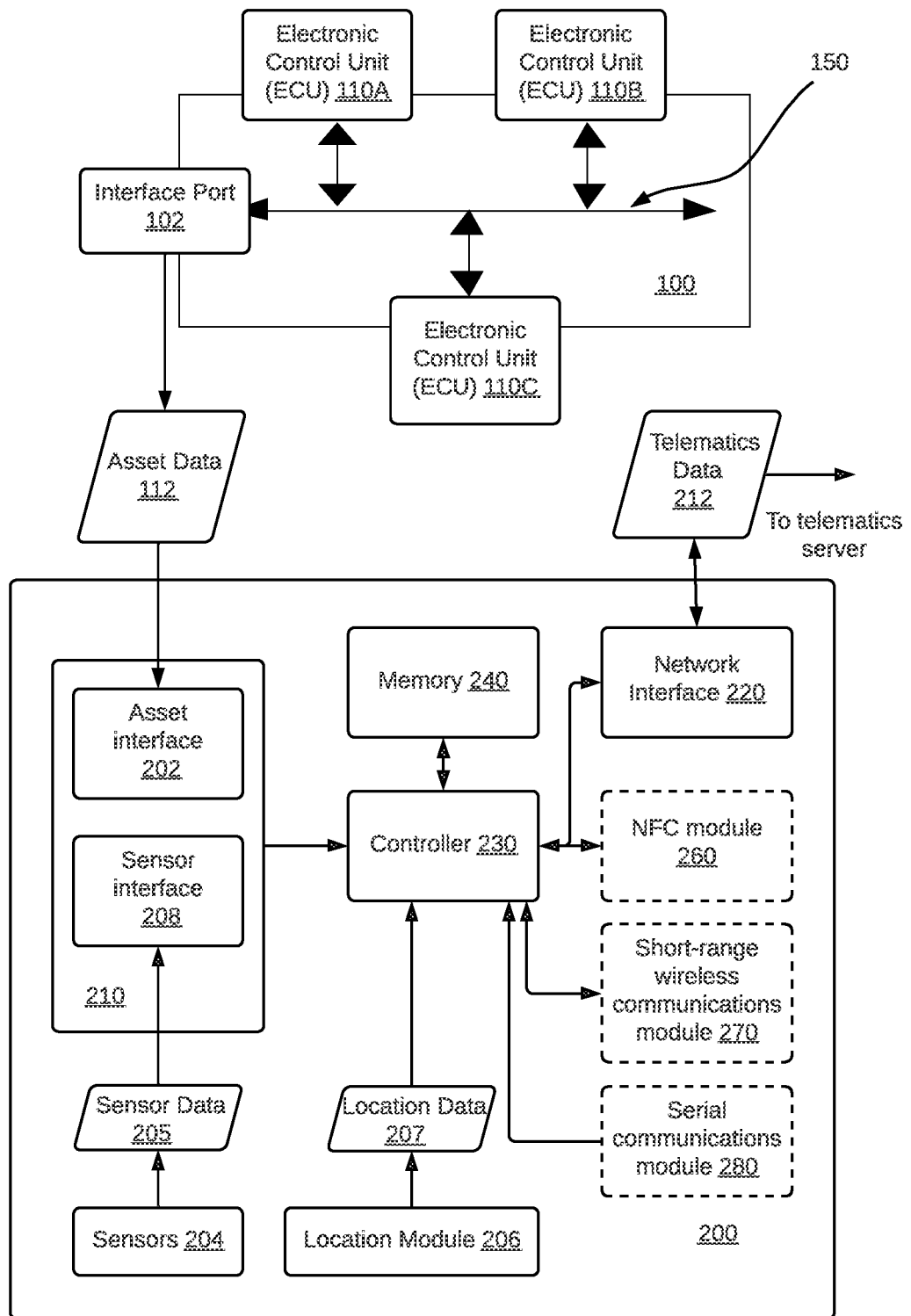
FIG. 2 is a block diagram showing a telematics device coupled to an asset.

Further details relating to the telematics device 200 and how it interfaces with an asset 100 are shown with reference to FIG. 2. FIG. 2 depicts an asset 100 and a telematics device 200 coupled thereto. Selected relevant components of each of the asset 100 and the telematics device 200 are shown.

The asset 100 may have a plurality of electronic control units (ECUs). An ECU is an electronic module which interfaces with one or more sensors for gathering information from the asset 100. A vehicle may contain an engine ECU, a transmission ECU, and other ECUs providing asset data. For example, an engine ECU may contain a temperature sensor and a controller for converting the measured engine coolant temperature into digital data representative of the coolant temperature. Similarly, an engine ECU may contain a voltage sensor for measuring the voltage at the positive battery terminal (i.e, the supply voltage) and a controller for converting the measured voltage into digital data representative of the battery voltage. A vehicle may, for example, have around seventy ECUs. For simplicity, only a few of the ECUs 110 are depicted in FIG. 2. For example, in the depicted embodiment the asset 100 has three electronic control units: ECU 110A, ECU 1108, and ECU 110C ("ECUs 110"). The ECU 110A, the ECU 1108, and the ECU 110C are shown to be interconnected via an asset communications bus, such as a Controller Area Network (CAN) bus 150, a Local Interconnect Network (LIN) bus, a Media Oriented Systems Transport (MOST) bus, or a FlexRay bus. ECUs 110 interconnected using the CAN bus 150 send and receive information to one another in CAN data frames by placing the information on the CAN bus 150. When an ECU places information on the CAN bus 150, other ECUs 110 receive the information and may or may not consume or use that information. Different protocols may be used to exchange information between the ECUs over a CAN bus. For example, ECUs 110 in trucks and heavy vehicles use the Society of Automotive Engineering (SAE) J1939 protocol for diagnostic and control services of ECUs on a CAN bus 150. Most passenger vehicles use the J14229 known as the Unified Diagnostic Services (UDS), and in some cases the SAE J1979 protocol known as On-Board Diagnostic (OBD) protocol for standardized (i.e., legislated) diagnostic services on the ECUs 110 on the CAN bus 150. Other diagnostic services, such as OEM-specific and proprietary diagnostic services, may be carried out using proprietary protocols. In industrial automation, ECUs use a CANOpen protocol to exchange information over a CAN bus 150. An asset 100 may allow access to information exchanged over the CAN bus 150 via an interface port 102. For example, if the asset 100 is a passenger car, then the interface port 102 is most likely an OBD-II port. Data accessible through the interface port 102 is termed the asset data 112. In some embodiments, the interface port 102 includes a power interface for providing electric power to a telematics device 200 connected thereto.

The telematics device 200 includes a controller 230 coupled to a memory 240, an interface layer 210 and a network interface 220. The telematics device 200 also includes one or more sensors 204 and a location module 206 coupled to the interface layer 210. The telematics device 200 may also contain some optional components, shown in dashed lines in FIG. 2. For example, the telematics device 200 may contain one or more of: a near-field communications (NFC) module such as NFC module 260, a short-range wireless communications module 270, and a wired communications module such as a serial communications module 280. In some embodiments (not shown), the telematics device 200 may have a dedicated power source or a battery. In other embodiments, the telematics device 200 may receive power directly from the asset 100, via the interface port 102. The telematics device 200 shown is an example. Some of the components shown in solid lines may also be optional and may be implemented in separate modules. For example, some telematics devices (not shown) may not have a location module 206 and may rely on an external location module for obtaining the location data 207. Some telematics devices may not have any sensors 204 and may rely on external sensors for obtaining sensor data 205.

The controller 230 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the controller 230 as described herein. The controller 230 may have an internal memory for storing machine-executable programming instructions to carry out the methods described herein.

The memory 240 may include read-only-memory (ROM), random access memory (RAM), flash memory, magnetic storage, optical storage, and similar, or any combination thereof, for storing machine-executable programming instructions and data to support the functionality described herein. The memory 240 is coupled to the controller 230 thus enabling the controller 230 to execute the machine-executable programming instructions stored in the memory 240 and to access the data stored therein. The memory 240 may contain machine-executable programming instructions, which when executed by the controller 230, configures the telematics device 200 for receiving asset data 112 from the asset 100 via the asset interface 202, and for receiving sensor data 205 from the sensors 204 and/or location data 207 from the location module 206 via the sensor interface 208. The memory 240 may also contain machine-executable programming instructions for combining asset data 112, sensor data 205 and location data 207 into telematics data 212. Additionally, the memory 240 may further contain instructions which, when executed by the controller 230, configures the telematics device 200 to transmit the telematics data 212 via the network interface 220 to a telematics server 300 over a network 50. In some embodiments, the memory 240 only stores data, and the machine-executable programming instructions for carrying out the aforementioned tasks are stored in an internal memory of the controller 230.

The location module 206 may be a global positioning system (GPS) transceiver or another type of location determination peripheral that may use, for example, wireless network information for location determination. The location module 206 is coupled to the controller 230 and provides location data 207 thereto. The location data 207 may be in the form of a latitude and longitude, for example.

The sensors 204 may be one or more of: a temperature sensor, a pressure sensor, an optical sensor, a motion sensor such as an accelerometer, a gyroscope, or any other suitable sensor indicating a condition pertaining to the asset 100 to which the telematics device 200 is coupled. The sensors provide sensor data 205 to the controller 230 via the sensor interface 208.

The interface layer 210 may include a sensor interface 208 and an asset interface 202. The sensor interface 208 is configured for receiving the sensor data 205 from the sensors 204. For example, the sensor interface 208 interfaces with the sensors 204 and receives the sensor data 205 therefrom. The asset interface 202 receives asset data 112 from the asset 100. In the depicted embodiment, the asset interface 202 is coupled to the interface port 102 of the asset 100. The asset data 112, received at the telematics device 200, from the asset 100 may be in the form of data messages, such as CAN data frames. The asset data 112 may describe one or more of any of: a property, a state, and an operating condition of the asset 100. For example, where the asset 100 is a vehicle, the data may describe the speed at which the vehicle is traveling, a state of the vehicle (off, idle, or running), or an engine operating condition (e.g., engine oil temperature, engine revolutions-per-minutes (RPM), or a battery voltage). In addition to receiving the asset data 112, in some embodiments the asset interface 202 may also receive power from the asset 100 via the interface port 102. The interface layer 210 is coupled to the controller 230 and provides both the asset data 112 and the sensor data 205 to the controller 230.

The network interface 220 may include a cellular modem, such as an LTE-M modem, CAT-M modem, other cellular modem, Wi-Fi modem, or any other communication device configured for communication via the network 50 with which to communicate with the telematics server 300. The network interface 220 may be used to transmit telematics data 212 obtained from the asset 100 to the telematics server 300 for a telematics service or other purposes. The network interface 220 may also be used to receive instructions from the telematics server 300 for configuring the telematics device 200 in a certain mode and/or requesting a particular type of the asset data 112 from the asset 100.

The NFC module 260 may be an NFC reader which can read information stored on an NFC tag. The NFC module 260 may be used to confirm the identity of the operator 10 by having the operator 10 tap an NFC tag onto the telematics device 200 such that the NFC tag is read by the NFC module 260. The information read from the NFC tag may be included in the telematics data 212 sent by the telematics device 200 to the telematics server 300.

The short-range wireless communications module 270 is a component intended for providing short-range wireless communication capability to the telematics device 200. The short-range wireless communications module 270 may be a Bluetooth™. wireless fidelity (Wi-Fi), Zigbee™, or any other short-range wireless communications module. The short-range wireless communications module 270 allows other devices to communicate with the telematics device 200 over a short-range wireless network.

The serial communications module 280 is an example of a wired communications module. The serial communications module 280 is an electronic peripheral for providing serial wired communications to the telematics device 200. For example, the serial communications module 280 may include a universal asynchronous receiver transmitter (UART) providing serial communications per the RS-232 protocol. Alternatively, the serial communications module 280 may be a serial peripheral interface (SPI) bus, or an inter-integrated circuit ($I^2C$) bus. As another example, the serial communications module 280 may be a universal serial bus (USB) transceiver.

In operation, an ECU 110, such as the ECU 110A, the ECU 110B, or the ECU 110C communicates asset data over the CAN bus 150. The asset data exchanged, between the ECUs 110, over the CAN bus 150 are accessible via the interface port 102 and may be retrieved as the asset data 112 by the telematics device 200. The controller 230 of the telematics device 200 receives the asset data 112 via the asset interface 202. The controller 230 may also receive sensor data 205 from the sensors 204 over the sensor interface 208. Furthermore, the controller 230 may receive location data 207 from the location module 206. The controller 230 combines the asset data 112 with the sensor data 205 and the location data 207 to obtain the telematics data 212. The controller 230 transmits the telematics data 212 to the telematics server 300 over the network 50 via the network interface 220. Optionally, an operator 10 may tap an NFC tag to the NFC module 260 to identify themself as the operator 10 of the asset 100. Additionally, an external peripheral, such as a GPS receiver, may connect with the telematics device 200 via the short-range wireless communications module 270 or the serial communications module 280 for providing location information thereto. In some embodiments, the telematics device 200 may receive, via the network interface 220, commands from the telematics server 300. The received commands instruct the telematics device 200 to be configured in a particular way. For example, the received commands may configure the way in which the telematics device gathers asset data 112 from the asset 100 as will be described in further detail below.

The telematics data 212, which is composed of asset data 112 gathered from the asset 100 combined with the sensor data 205 and the location data 207 may be used to derive useful data and analytics, by the telematics server 300. However, there are times when additional data, which is not provided by the asset 100, the sensors 204 or the location module 206 may be needed. The telematics device 200 may have a limited number of sensors 204 such as accelerometers or gyroscopes providing limited information about the motion of the asset 100 on which the telematics device 200 is deployed. The location module 206 may provide location and direction information. However, in some cases, more information may be needed to derive useful data and analytics pertaining to the asset 100. One example of information that is not typically provided by the telematics device 200 is video capture data. Another example of information that is not typically provided by the telematics device 200 is any proprietary signaling provided by devices which does not follow any of the standard protocols (OBD-II, J1939 or CANOpen). Some equipment may not have a CAN bus and may provide proprietary digital and/or analog signals. Examples of such devices include industrial equipment, winter maintenance equipment such as salt spreaders, farming equipment, and the like. Additionally, the telematics device 200 may not have an NFC module 260 or a short-range wireless communications module 270 thus limiting its connectivity capabilities.

Input/Output Expander

Figure 3:
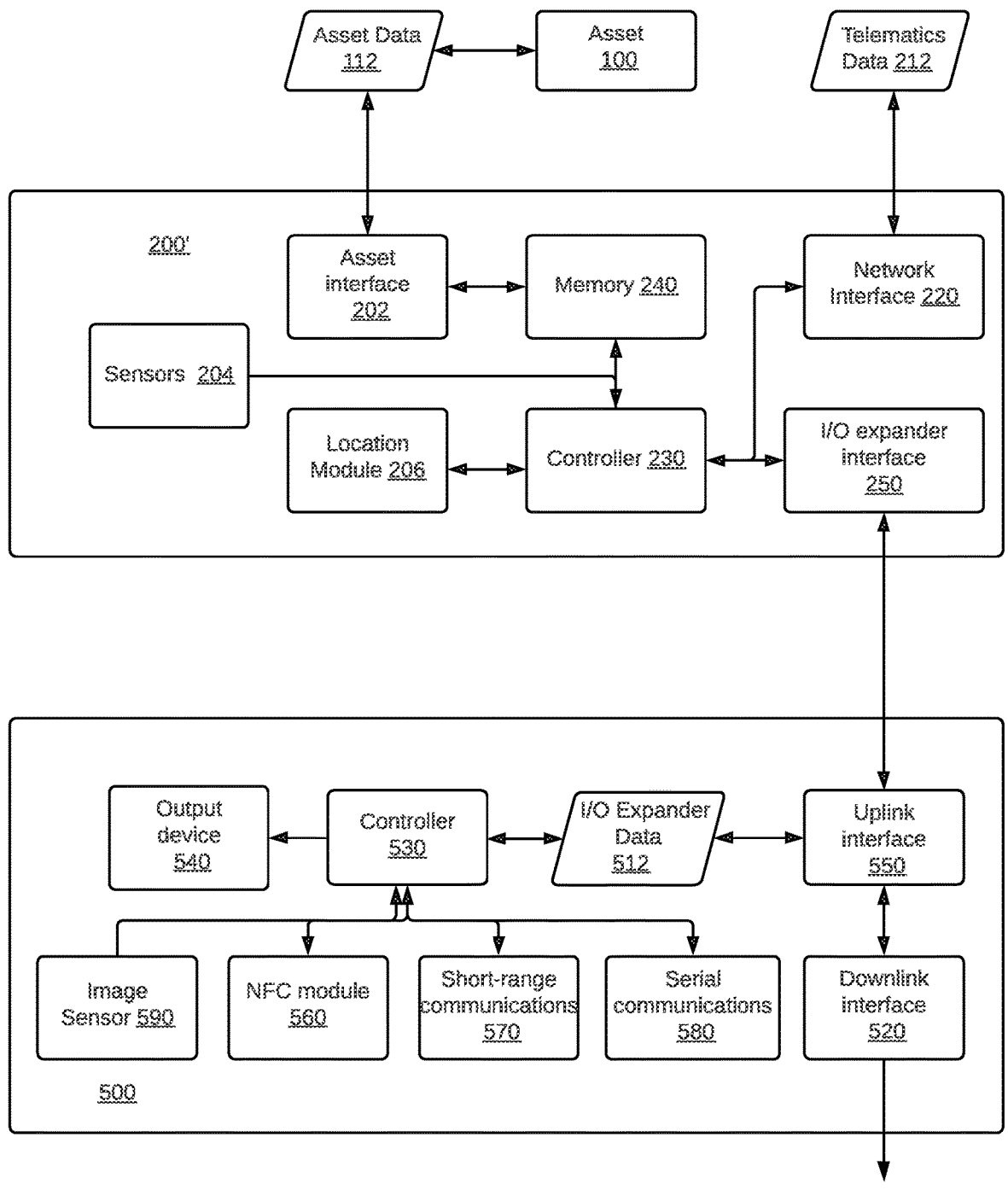
FIG. 3 is a block diagram showing a telematics device coupled to an asset and to an input/output (I/O) expander.

To capture and provide information or services not provided by the asset 100 or the telematics device, to produce an output, or to perform an action not supported by the telematics device, the telematics device 200 may be modified to allow an input/output expander device ("I/O expander") to connect thereto, as shown in FIG. 3. FIG. 3 shows a telematics device 200' coupled to an asset 100. An I/O expander 500 is coupled to the telematics device 200'.

The asset 100 is similar to the asset 100 of FIG. 2 and therefore the internal components thereof are not shown in FIG. 3 for simplicity.

The telematics device 200' has a somewhat similar configuration as the telematics device 200 of FIG. 2, but some of the optional components have been removed. Furthermore, the telematics device 200' adds an I/O expander interface 250 for interfacing with the I/O expander 500. The I/O expander interface 250 is coupled to the controller 230 and may be configured for exchanging I/O expander data 512 with the I/O expander 500.

The I/O expander 500 of FIG. 3 is an example I/O expander which is designed to provide additional connectivity options to a telematics device 200, which has more limited features than the one shown in FIG. 2. For example, the telematics device 200' shown in FIG. 3 does not have an NFC module, a short-range wireless communications module, or a serial communications module. Instead, the telematics device 200' has an I/O expander interface 250.

The I/O expander 500 may be an input device configured to capture additional data such as video frames, audio frames, or proprietary signals and provide that data to the telematics device 200'. Alternatively, or additionally, the I/O expander 500 may be configured as an output device and may include a display for displaying information and/or an audio output device for broadcasting messages pertaining to the asset 100.

An I/O expander 500, which connects with the telematics device 200', varies in complexity depending on the purpose thereof. FIG. 3 shows an I/O expander 500 containing several components which may or may not all be present in other I/O expanders. For example, the I/O expander 500 includes a controller 530, an NFC module 260, an output device 540, a short-range communications module 570, an image sensor 590, a serial communications module 580, an uplink interface 550 and a downlink interface 520.

The controller 530 may be similar to the controller 230 of FIG. 3. In some embodiments, the controller 530 is a microcontroller with versatile I/O capabilities. For example, the controller 530 may be a microcontroller which has a plurality of I/O ports such as general-purpose inputs and outputs (GPIOs), serial ports, analog inputs, and the like. In some embodiments, the controller 530 may have built-in persistent memory such as flash memory on which machine-executable programming instructions for carrying out the functionality of the I/O expander 500 may be stored. In other embodiments, the controller 530 may be coupled to a persistent memory module (not shown) that contains the machine-executable programming instructions for carrying out the functionality of the I/O expander 500. The controller 530 may also have built-in volatile memory, such as random-access memory (RAM) for storing data. Alternatively, the I/O expander 500 may be connected to an external volatile memory for storing data.

The output device 540 receives data from the controller 530 and performs an output function. For example, the output device 540 may include a display for displaying information received from the controller 530. As another example, the output device 540 may include a speech synthesizer and a speaker for displaying audible information received from the controller 530. As yet another example, the output device 540 may be an output interface to a hardware device. For example, the output device 540 may be a motor controller that interfaces to an electric motor.

The NFC module 560, short-range communications module 570, and the serial communications module 580 are similar to the NFC module 260, short-range wireless communications module 270, and the serial communications module 280 described above with reference to FIG. 2.

The image sensor 590 may be a digital still camera or a digital video camera capable of capturing images. For example, the image sensor 590 may be a road-facing dashboard camera for monitoring the road ahead. In other examples, the image sensor 590 may be a driver-facing dashboard camera for identifying the operator 10 and/or their condition.

The uplink interface 550 is an electronic peripheral interface coupled to the controller 530 and is used to provide data exchange and/or power capabilities to the I/O expander 500. The uplink interface 550 allows the I/O expander 500 to transmit and receive I/O expander data. The uplink interface 550 is configured to use the same protocol and signaling as the I/O expander interface 250 of the telematics device 200'. Accordingly, the I/O expander 500 may exchange the I/O expander data with the telematics device 200'. In some embodiments, the uplink interface 550 may also include power pins connected to corresponding power pins in the I/O expander interface 250, thus allowing the I/O expander 500 to be powered via the telematics device 200'. In other embodiments (not shown), the I/O expander 500 may have its own power source instead of or in addition to the power provided by the telematics device 200' via the uplink interface 550.

The downlink interface 520 is an electronic peripheral interface coupled to the uplink interface 550. The downlink interface 520 is configured to interface with the uplink interface 550 of another I/O expander 500 (as will be described below). Allowing the uplink interface 550 to connect to the downlink interface 520 of another I/O expander 500 allows the daisy chaining of I/O expanders 500.

Integrated Telematics Device

Figure 4:
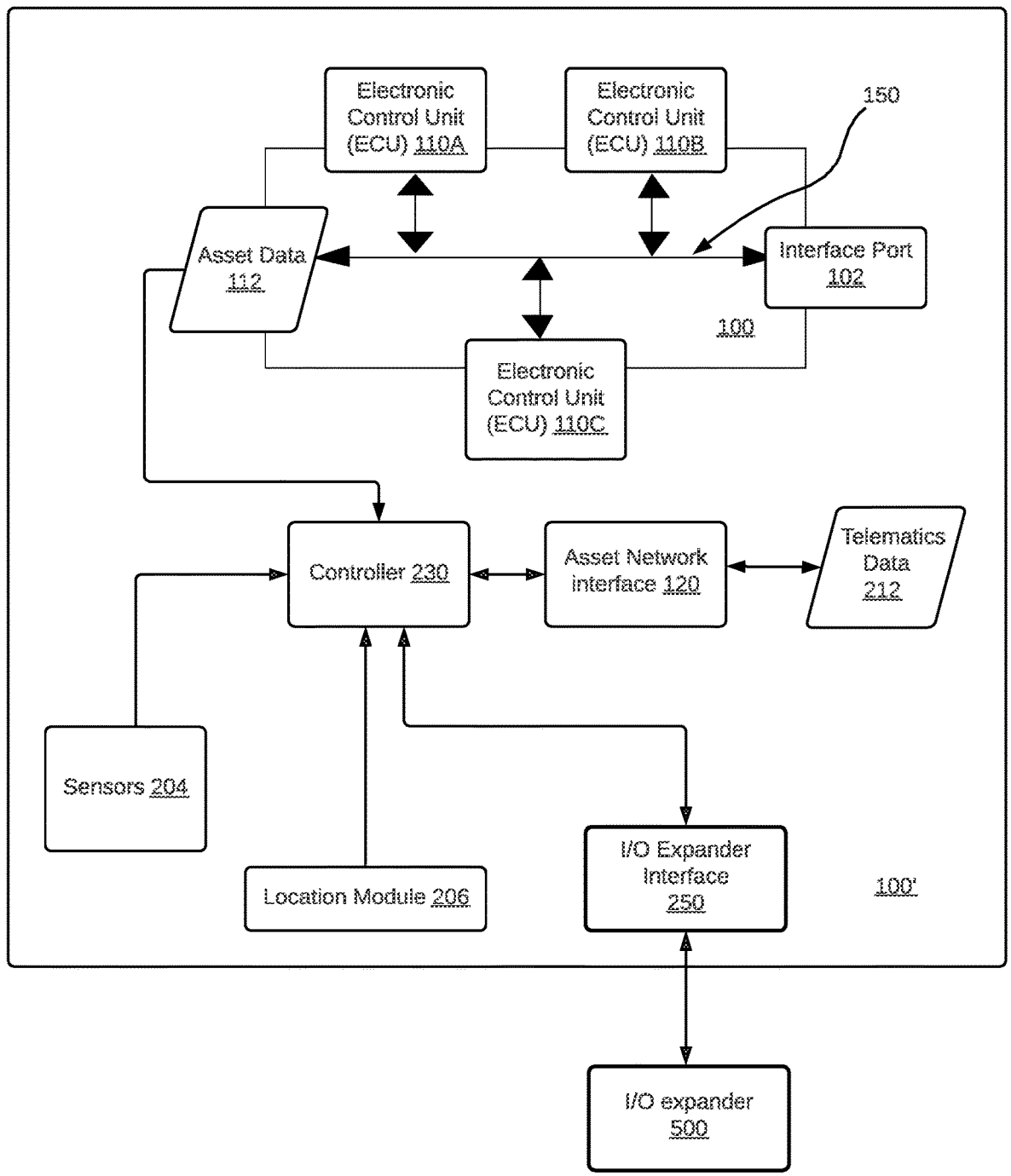
FIG. 4 is a block diagram showing an asset having a telematics device integrated therein and an I/O expander coupled thereto.

In the above-mentioned figures, a telematics device is shown as a separate entity connected with a corresponding asset. The telematics device, however, may have its components integrated into the asset 100 at the time of manufacture of the asset 100. This may be the case when the asset 100 is a connected car having an asset network interface. For example, with reference to FIG. 4, there is shown an asset 100' with the components of a telematics device integrated therein, in accordance with embodiments of the present disclosure. The asset 100' is similar to the asset 100 but, being a connected asset such as a connected car, it has an asset network interface 120. In the depicted embodiment, the controller 230 is directly connected to the asset communications bus, which is a CAN bus 150 and may directly obtain the asset data 112 therefrom. The sensors 204 and the location module 206 are also integrated into the asset 100 and provide the sensor data 205 and the location data 207 to the controller 230 as described above. The asset network interface 120 belongs to the asset 100' and may be used by the asset 100 to communicate with an original equipment manufacturer (OEM) server, to a roadside assistance server, or for other purposes. The controller 230 may utilize the asset network interface 120 for the transmission of telematics data 212 provided by the controller 230. In order to support further not provided by the integrated peripherals such as the sensors 204 and the location module 206, the asset has an I/O expander interface 250 coupled to the controller 230 so that an I/O expander 500 may be connected to the asset 100' therethrough. The asset 100' may have an interface port 102 for connecting other devices other than a telematics device 200, such as a diagnostic tool including, but not limited to, an OBD-II reader device.

Diagnostic Equipment

Figure 5:
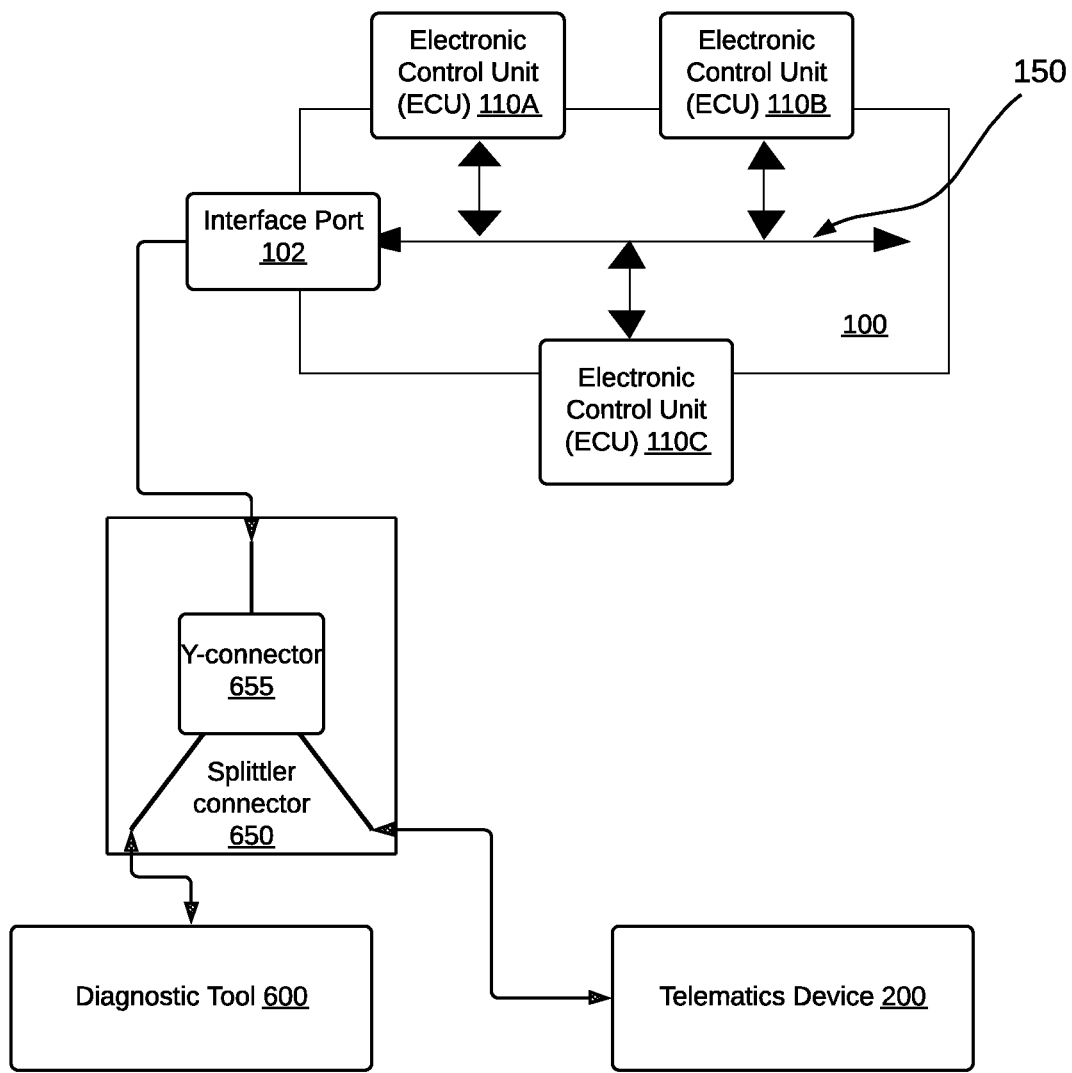
FIG. 5 is a block diagram showing a telematics device and a diagnostic tool both connected to a communication bus of an asset via a splitter connector.

As briefly mentioned above, a vehicle asset may be connected to a diagnostic tool 600, such as an OBD-II reader, in addition to having a telematics device 200 connected therewith. FIG. 5 depicts an asset 100 connected to both a telematics device 200 and a diagnostic tool 600 via a splitter connector 650.

The asset 100 may be a vehicle asset similar to the asset 100 of FIG. 2. As discussed above, the asset 100 may have an interface port 102 which gives access to the CAN bus 150 thereof.

The telematics device 200 may be a telematics device similar to the telematics device 200 of FIG. 2 or the telematics device 200' of FIG. 3.

In this disclosure a "diagnostic tool" is an electronic device that may be used to read asset data 112 for the purpose of diagnosing problems, conducting performance testing such as emission testing, or ECU programming. A diagnostic tool may also clear some engine error codes. A diagnostic tool may also be referred to as a "scan tool" or a "testing tool". In the depicted embodiment of FIG. 5, the diagnostic tool 600 may be an OBD-II reader or any other diagnostic tool for use with a vehicle asset. For example, the diagnostic tool 600 may read asset data 112 for the purpose of performing an emissions test, or to check error codes generated by the vehicle asset's ECUs in response to the "check engine" indicator being turned on in the vehicle asset's dashboard. The diagnostic tool 600 may be a stationary diagnostic tool installed in a workshop, or a portable diagnostic tool. In some cases, the diagnostic tool 600 may be integrated into the asset and permanently connected to the CAN bus 150. In other cases, the diagnostic tool 600 may be removable from the asset but is typically connected thereto most of the time during normal operation. The diagnostic tool 600 may send request frames to at least some of the ECUs 110 of the asset 100 requesting certain information. For example, for an asset having a communications bus such as a CAN bus 150, the diagnostic tool 600 sends CAN data frames containing request commands that cause one or more of the ECUs 110 to respond with information that is used by the diagnostic tool 600 to report errors or diagnose problems. Additionally, the diagnostic tool may send CAN data frames containing diagnostic protocol frames including commands that may reset one or more error conditions on one or more ECUs 110. More information on CAN data frames, transport protocols, and diagnostic protocols is provided below.

In this disclosure, a "splitter connector" refers to a device, cable, or harness that splits an electrical connection into two thus allowing two electrical devices to connect to the same interface. A splitter connector may include a Y-connector or a T-connector. The splitter connector 650 depicted in FIG. 5 comprises a Y-connector 655 for splitting a connection from the vehicle's interface port 102 into two connections so that both the telematics device 200 and the diagnostic tool 600 may have access to the interface port 102 and the CAN bus 150. For example, if the telematics device 200 is not to be removed from the vehicle at any time or the vehicle may be in violation of some regulations, then in order to also perform some diagnostics or emission tests, the telematics device 200 is connected to one of the two connections provided by the splitter connector 650. As a result, the diagnostic tool 600 may be connected to the other one of the two connections provided by the splitter connector 650. In some cases, a splitter connector may be referred to as a "splitter harness".

Figure 6:
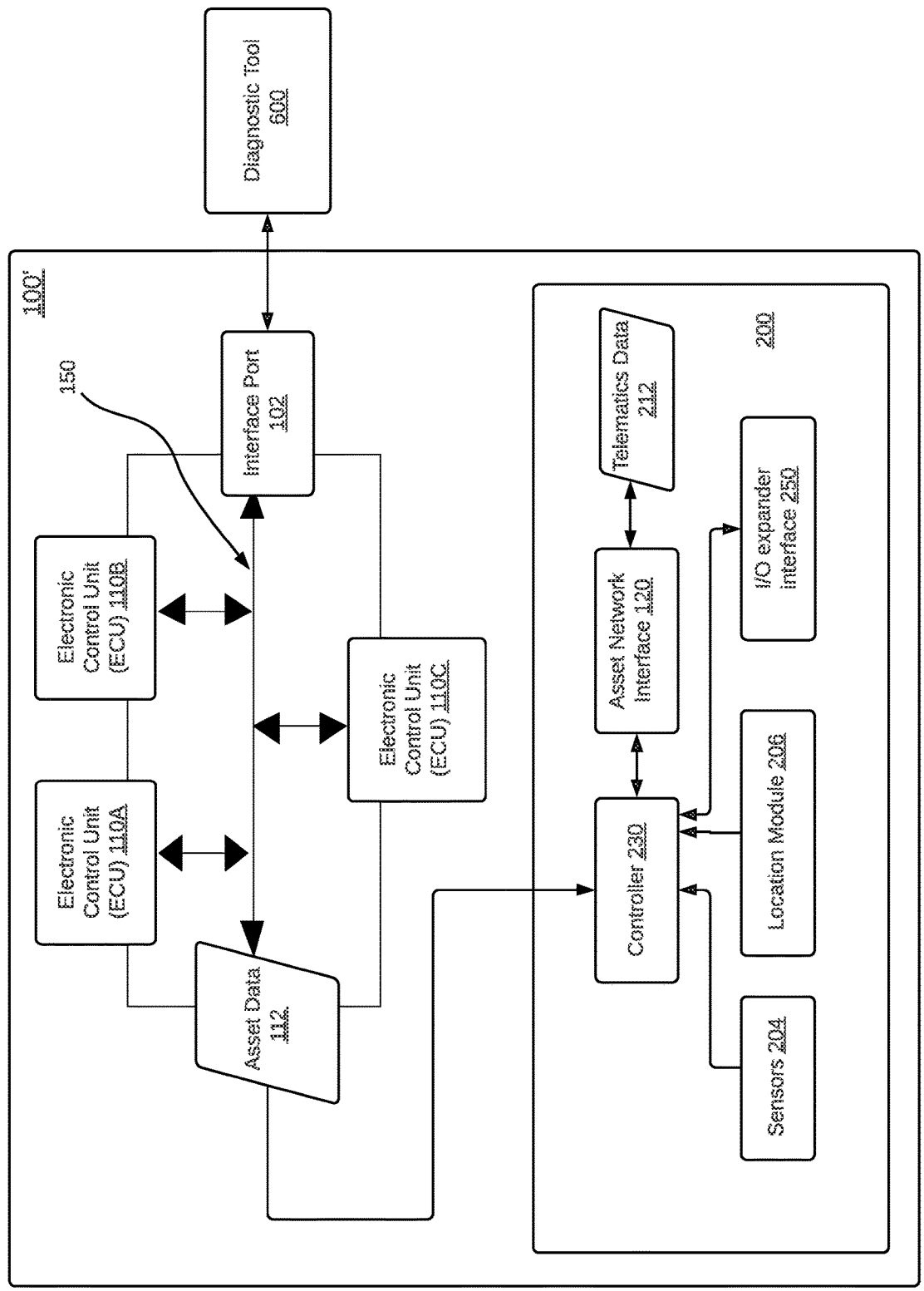
FIG. 6 is a block diagram showing the asset of FIG. 4, which has an integrated telematics device shown with a diagnostic tool connected to the communication bus thereof.

With reference to FIG. 6, there is shown an asset 100' having a telematics device integrated therein as discussed above with reference to FIG. 4. In this embodiment, a diagnostic tool 600 may be connected directly to the interface port 102 and gain access to the asset communications bus, such as the CAN bus 150. As such, both the telematics device, which is integrated into the asset 100', and the diagnostic tool 600 may communicate with the ECUs 110 of the asset 100'.

In the embodiments of both FIG. 5 and FIG. 6, there is a concern regarding a conflict between the telematics device 200 and the diagnostic tool 600 as they both communicate with the ECUs 110 of the asset 100 or the asset 110' on the asset communications bus, such as the CAN bus 150. The conflict may be a result of the way both the telematics device 200 and the diagnostic tool 600 interact with the assets 100 or 100', coincidental similarities in the format and/or content of the frames exchanged, or other reasons. The conflict between the telematics device 200 and the diagnostic tool 600 may result in a number of problems. The first problem is the loss of asset data 112 gathered by the telematics device 200. The second problem is the potential loss of data gathered by the diagnostic tool 600. The conflict between the telematics device 200 and the diagnostic tool 600 may hinder the diagnostic tool's ability to read diagnostic trouble codes (DTC and/or other diagnostic data during vehicle service or inspection.

In this disclosure, there are described methods by the telematics device 200 for detecting the co-presence of a diagnostic tool 600 on the asset communications bus and for configuring the telematics device 200 in a non-interfering mode to mitigate conflicts arising from the co-presence. The potential conflict between the telematics device 200 and the diagnostic tool 600 depends, at least in part, on the way in which the telematics device 200 obtains the asset data 112. The telematics device 200 may obtain asset data 112 from the asset 100 or the asset 100' in a number of ways. In some instances, the telematics device 200 listens to data frames broadcast or sent over the vehicle communications bus, such as the CAN bus 150. The data frames may broadcast CAN data frames containing the asset data 112 that the telematics device 200 may use to infer the status of the asset. In other instances, the telematics device 200 requests the asset data 112 of interest thereto from the asset. Requesting the asset data 112 includes the telematics device 200 sending directed request frames to one or more ECU 110 in the asset. For example, the telematics device may send diagnostic requests in accordance with one or more diagnostic protocols to one or more ECUs 110. Upon receiving the directed request frames, the one or more ECU 110 responds by sending a diagnostic response containing the requested asset data 112 on the vehicle communications bus, such as the CAN bus 150. Details of transactions containing diagnostic requests and responses are provided below.

Figure 7:
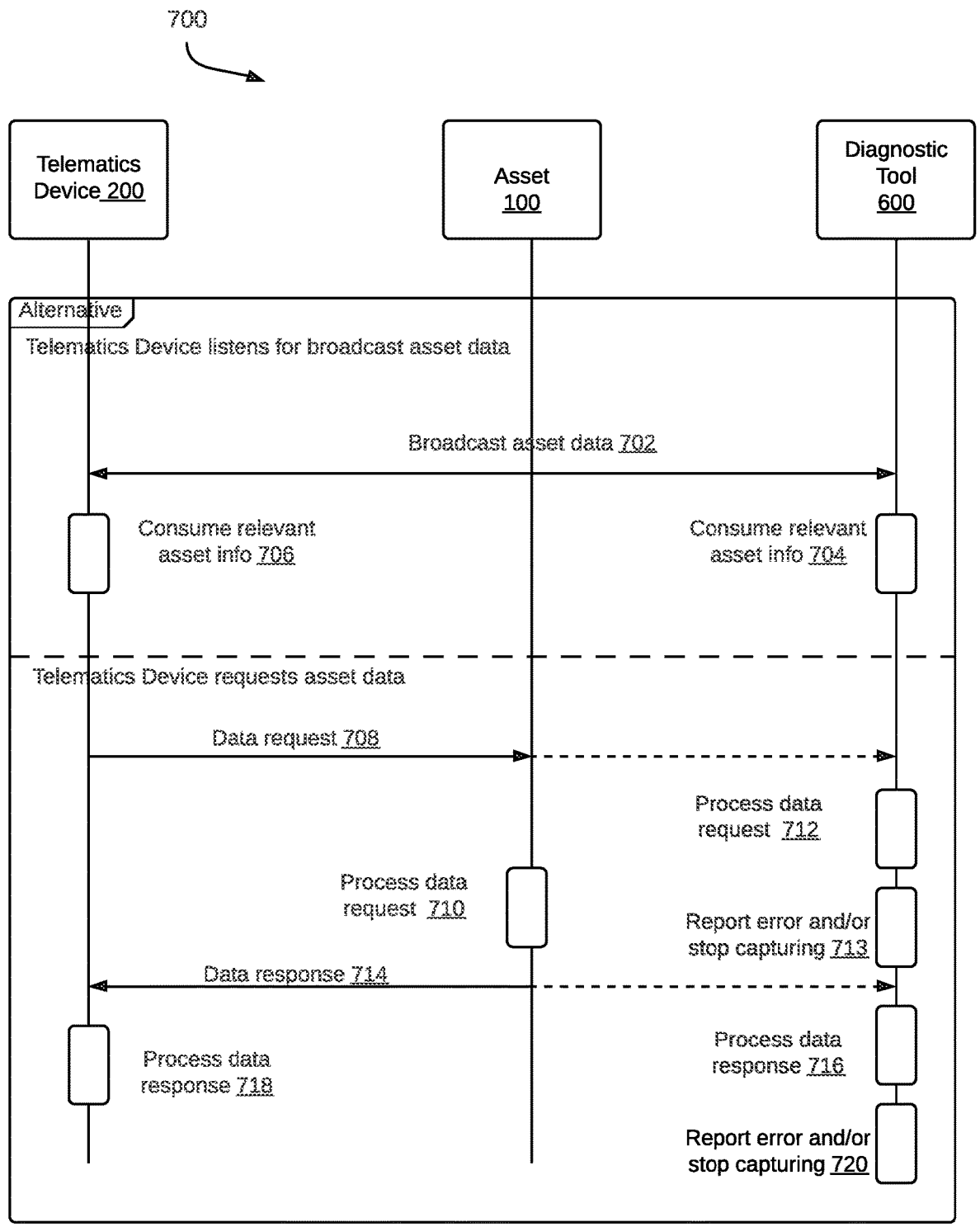
FIG. 7 is a message sequence diagram illustrating potential problems with a diagnostic tool's operation due to request messages sent by a telematics device connected to the same communication bus.

FIG. 7 is a message sequence diagram 700 illustrating the different ways that the telematics device 200 captures asset information from the asset 100, which may be a vehicle asset. It should be understood from FIG. 7 that the asset 100 represents a plurality of ECUs 110 that may broadcast asset data or send asset data in response to requests. The first way that an asset 100 may provide asset data 112 is depicted as the first alternative of the sequence diagram. The first way involves the telematics device 200 listening for the asset data 112 broadcast from the asset 100, for example in broadcast CAN data frames. At step 702, the asset 100 broadcasts the asset data 112 on the communications bus, such as the CAN bus 150. Both the telematics device 200 and the diagnostic tool 600, which are connected to the CAN bus 150, may receive and consume the asset data 112. For example, at step 704, the diagnostic tool 600 consumes a first portion of the asset data 112 that is relevant to the function of the diagnostic tool 600. Similarly, at step 706, the telematics device 200 consumes a second portion of the asset information 112 that is relevant to the function of the telematics device 200. The first and second portions of the asset data 112 that are processed by the telematics device 200 and the diagnostic tool 600 may be the same or different. For example, the telematics device 200 may focus on processing real-time engine data and ignore other portions of the asset data 112. Conversely, the diagnostic tool 600 may only process engine error codes and parameters related to emissions testing such as evaporation system and oxygen sensor data. In the first alternative of the message sequence diagram 700, where the telematics device 200 listens for broadcast asset data, it is unlikely that a conflict arises between the telematics device 200 and the diagnostic tool 600 when they are both only listening for data frames placed on the CAN bus 150 by the ECUs 110 of the asset 100.

The second way that the telematics device 200 may obtain the asset data 112 from the asset 100 is by directly requesting some specific data via a request command sent in a directed frame over the asset communications bus, such as the CAN bus 150. This way is depicted as the second alternative of the message sequence diagram 700 in which the telematics device 200 requests asset data by sending a data request to the asset 100. At step 708, the telematics device 200 sends a data request to the asset 100. For example, the telematics device 200 may send a CAN data frame on the CAN bus 150, wherein the CAN data frame contains a diagnostic protocol frame including a command which requests specific data from one or more ECUs 110 of the asset 100. Due to the nature of the CAN bus 150 where frames are placed on the bus and are accessible by any ECU 110 or another device connected to the CAN bus 150, the CAN data frame sent by the telematics device 200 may also be read by the diagnostic tool 600. In some instances, the diagnostic tool 600 may ignore the CAN data frame sent by the telematics device 200 as a frame containing a payload that the diagnostic tool 600 is not interested in. However, in other instances, the diagnostic tool 600 may assume that the CAN data frame sent by the telematics device 200 was sent by an ECU 110 of the asset 100 and may process it at step 712, which is undesirable. In further instances, the diagnostic tool 600 upon seeing a directed data request from another device, may terminate all communications with the asset and report an error. Processing the CAN data frame, which was sent by the telematics device 200, requesting asset data 112, by the diagnostic tool 600 is undesirable because it may lead the diagnostic tool 600 to deduce that the asset 100 is not functioning properly or is incompatible with the diagnostic tool 600. In some cases, as shown in step 713, the diagnostic tool 600 may issue an error message and/or refrain from capturing further frames containing asset data from the asset communications bus, such as the CAN bus 150. As a result, the diagnostic tool 600 may fail to report diagnostic trouble codes (DTCs) or complete an emissions test.

In response to receiving the request frame sent at step 708, at least some of the ECUs 110 of the asset 100 may process the data request pertaining thereto, at step 710. In response to processing the information request frame, at step 714 the ECU(s) 110 which has processed the request frame may send a portion of asset data 112 pertaining to the request frame to the telematics device 200. At step 718, the telematics device 200 processes the portion of asset data 112 provided by the asset 100 in step 714. Since the CAN bus 150 is a shared bus to which the diagnostic tool 600 is connected, the diagnostic tool 600 may also receive data response comprising the portion of asset data 112 requested by the telematics device 200 at step 714. As a result, at step 716 the diagnostic tool 600 may also process the portion of the asset data 112 provided by the asset 100. As a result of processing the portion of the asset data 112 that the diagnostic tool 600 did not request, the diagnostic tool 600 may report an error or stop capturing asset data from the asset 100 as shown in step 720.

To address the conflict arising from the telematics device 200 posting request frames on the communications bus of the asset 100, the present disclosure proposes what is termed a "non-interfering mode" for the telematics device 200. The non-interfering mode is a mode in which the telematics device 200 does not interfere with a diagnostic tool 600 connected to the same asset communications bus. In this disclosure, the "non-interfering mode" of the telematics device 200 may be one of two modes: a "listen-only" mode, and a "requests-blocked" mode.

In a listen-only mode, the telematics device 200 configures the asset interface 202 thereof to only listen for frames on the CAN bus 150, totally refrains from sending any frames thereon, and does not acknowledge receipt of any frame on the CAN bus 150. On a vehicle asset that does not have a gateway between the CAN bus 150 and the interface port 102, a listen-only mode is an appropriate non-interfering mode. Since the telematics device 200 is directly connected to the CAN bus 150, even if the telematics device 200 does not acknowledge receipt of a CAN data frame containing a portion of asset data 112, other ECUs 110 on the CAN bus 150 will acknowledge receipt of the portion of asset data 112. Accordingly, the ECU 110 which has placed that portion of asset data 112 on the CAN bus 150 may continue to place similar portions of asset data 112 on the CAN bus 150. As discussed earlier, any data placed on the CAN bus 150 is available to all ECUs 110. An ECU 110 may acknowledge receipt of the data even if that ECU 110 does not consume the data placed on the CAN bus 150. For example, when one ECU 110 places data on a CAN bus 150 other ECUs pull an acknowledgement (ACK) bit low on the bus indicating that the data has been consumed. The ECU which placed the data on the CAN bus 150 does not know which other ECU (or telematics device) has consumed the data.

Figure 8:
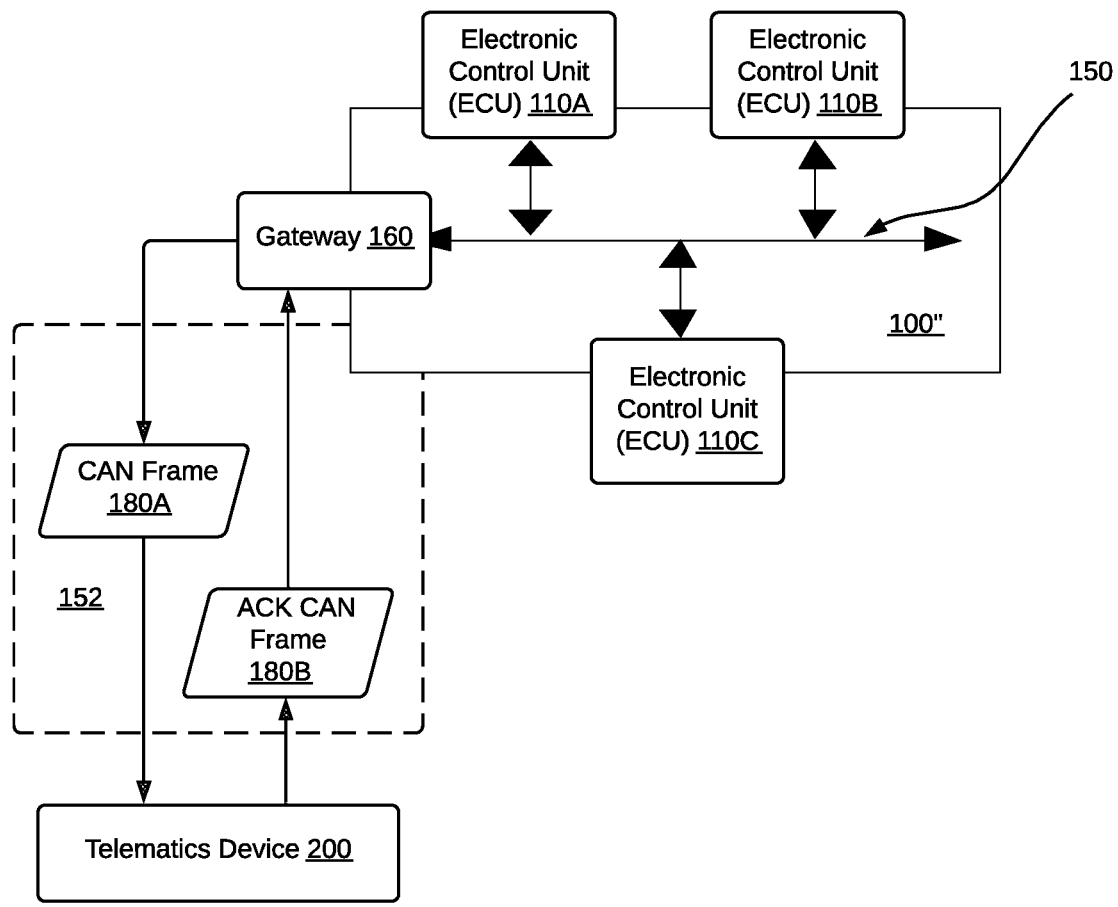
FIG. 8 is a block diagram showing an asset having a gateway and a telematics device coupled to the asset communication bus via the gateway.

In some assets, there is a gateway placed between the asset communications bus and external devices. The gateway controls the asset data 112 available to the external devices. In some instances, the gateway requires an explicit acknowledgement of the asset data from the external devices connected to the asset communications bus via the gateway. In the event that the gateway makes some data available to external devices but does not receive an acknowledgement that the data has been consumed by the external devices, the gateway may refrain from making portions of asset data 112 available to external devices going forward. In this case, the listen-only mode for the telematics device 200 is not an appropriate non-interfering mode. The telematics device 200 uses a requests-blocked mode as the non-interfering mode. To illustrate, FIG. 8 illustrates an asset 100" incorporating a gateway 160 providing access to the CAN bus 150. The telematics device 200 is connected to the asset 100" via the gateway 160. It may be said that the telematics device 200 is connected on an external CAN bus 152 of the asset 100". In the illustrated embodiment, the interface port 102 is incorporated into the gateway 160 and is not shown as a separate component for simplicity. The gateway 160 may place a CAN data frame 180A on the external CAN bus 152 so it may be read by the telematics device 200. The gateway 160 expects to receive an acknowledged (ACK) CAN data frame 180B in response to placing the CAN data frame 180A on the external CAN bus 152. If the telematics device 200 does not acknowledge the CAN data frame 180A, then the gateway 160 may assume that no external devices are connected to the external CAN bus 152 and may refrain from placing further CAN data frames thereon. Accordingly, the telematics device 200 uses a requests-blocked mode as its non-interfering mode when connected to vehicles incorporating a gateway 160. In the requests-blocked mode, the telematics device 200 refrains from sending any requests to the asset 100", but acknowledges any CAN data frames containing asset data when it receives the same from the asset 100" via the gateway 160.

A telematics device 200 may enter a non-interfering mode such as a listen-only mode or a requests-blocked mode based on a determination of a presence on the asset communications bus to which the telematics device 200 is connected. Diagnostic tool detection may be performed in a number of ways based on a sensitivity level. The sensitivity level determines the conditions that need to be met so that the telematics device 200 determines the presence of another device on the CAN bus 150 as the telematics device 200. The sensitivity level may depend, in part, on a vehicle type, a vehicle identifier, or be set by a fleet manager or an operator. Additionally, the telematics device 200 may or may not enter a non-interfering mode based on a plurality of non-interfering mode configuration rules.

Figure 9:
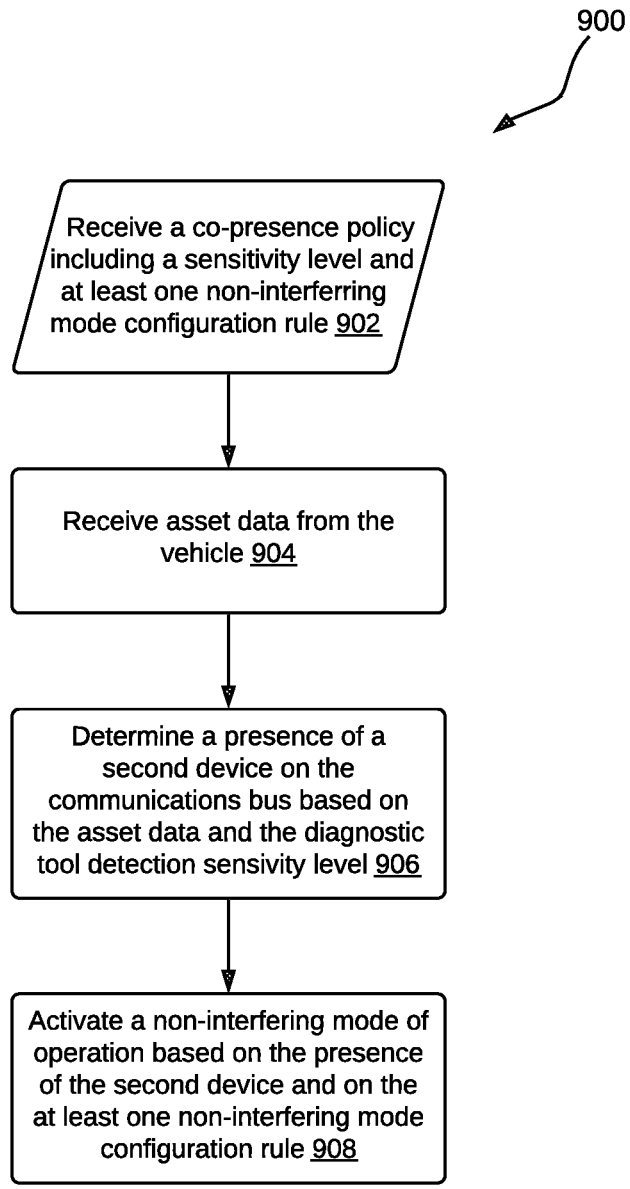
FIG. 9 is a flow chart of a method for managing co-presence of a telematics device and a diagnostic tool on an asset communications bus, in accordance with embodiments of the present disclosure.

Collectively, the sensitivity level and the plurality of non-interfering mode configuration rules comprise a co-presence policy that governs the telematics device behavior in both detecting the presence of another device on the communications bus and for enabling or refraining from enabling a non-interfering mode. The co-presence policy may be selected based on the vehicle type of the vehicle to which the telematics device is coupled, the specific vehicle identifier of the vehicle to which the telematics device 200 is coupled, or may be set by a fleet manager 20 or an operator 10 of the vehicle. A method 900 for configuring a telematics device 200 sharing a CAN bus 150 with another device such as a diagnostic tool is shown in FIG. 9.

The method 900 is carried out by a telematics device 200. At step 902, the telematics device 200 receives a co-presence policy including a sensitivity level and at least one non-interfering mode configuration rule. The telematics device 200 may receive the policy from a telematics server 300, for example by a method 1000 described below with reference to FIG. 10. The sensitivity level may be used in selecting a detection scheme for detecting another device on the asset communications bus. While the sensitivity level is referred to as a diagnostic tool detection sensitivity level, the sensitivity level may be used in selecting a detection scheme for any device having a presence on the asset communications bus. FIG. 12 shows a table including a plurality of diagnostic tool detection sensitivity levels 1200, and will be described further below. The co-presence policy may also include at least one non-interfering mode configuration rule that determines whether the telematics device 200 will run in (or enable) a non-interfering mode. FIG. 13 shows a table showing a plurality of non-interfering mode configuration rules 1300, and will be described further below.

At step 904, the telematics device 200 receives asset data 112 from the vehicle to which the telematics device 200 is coupled. The asset data 112 may comprise CAN frames including transport frames and/or diagnostic frames. A description of such frames is provided below with reference to FIGS. 11A and 11B.

At step 906, the telematics device 200 examines the asset data 112 in accordance with the diagnostic tool detection sensitivity level, and determines the presence (or lack of presence) of a second device (such as a diagnostic tool) on the asset communication bus to which the telematics device 200 is connected. For example, the telematics device 200 may determine whether a second device, such as a diagnostic tool, is connected to the CAN bus 150 to which the telematics device 200 is connected. The different detection modes (or schemes) employed by the telematics device 200 to determine the presence of a second device on the asset communications bus are described with reference to the sensitivity levels described in FIG. 12.

At step 908, the telematics device activates a non-interfering mode of operation based on the presence of the second device and on the non-interfering mode configuration rules. The non-interfering mode configuration rules are described further with reference to FIG. 13.

Figure 10:
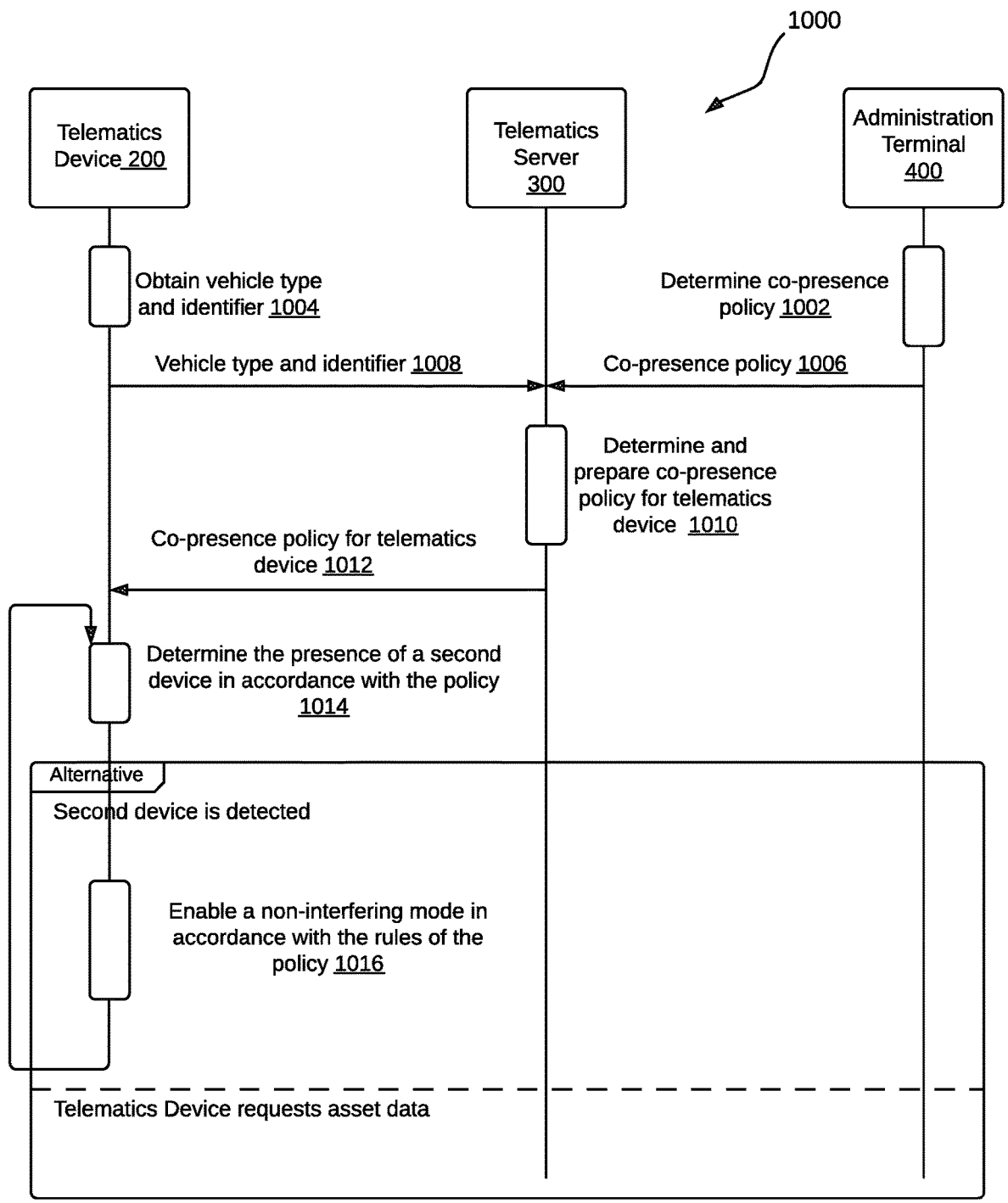
FIG. 10 is a message sequence diagram illustrating a method for configuring a telematics device with a co-presence policy, in accordance with an embodiment of the present disclosure.

As discussed above with reference to step 902 of FIG. 9, the telematics device 200 receives a policy including a diagnostic tool detection sensitivity level and at least one non-interfering mode configuration rule. The policy may be termed a "coexistence policy" or "co-presence policy" as it governs the detection of a second device on the same asset communications bus as the telematics device and also governs how to configure the telematics device 200 to minimize interference with the second device. FIG. 10 depicts a message sequence diagram showing a method 1000 of configuring the telematics device 200 with the co-presence policy, in accordance with an embodiment of the present disclosure.

Figure 14:
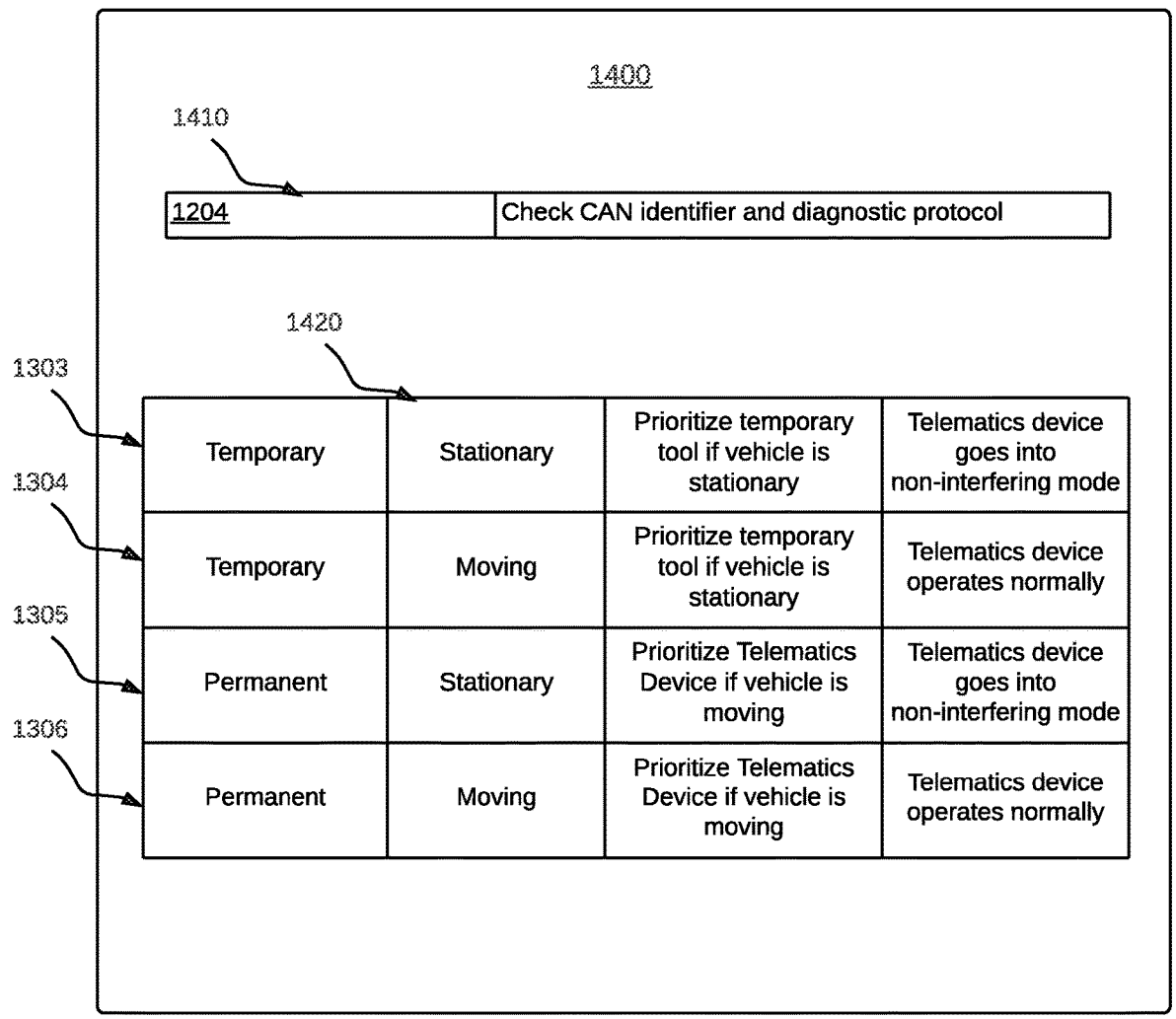
FIG. 14 is an example co-presence policy containing a diagnostic tool detection sensitivity setting and a plurality of non-interfering mode configuration rules, in accordance with embodiments of the present disclosure.

At step 1002, an administration terminal 400 determines the co-presence policy for a particular vehicle or a vehicle type. For example, a fleet manager 20 may use the administration terminal 400 to configure the telematics device 200 associated with a particular vehicle type or a particular vehicle in accordance with a specified co-presence policy. The particular vehicle may be specified by an identifier, such as a Vehicle Identification Number (VIN). A vehicle type may comprise one or more of a make, model, trim, and year of production. The co-presence policy may specify a diagnostic tool detection sensitivity level such as the sensitivity levels 1201, 1202, 1203, and 1204 from FIG. 11. The co-presence policy also specifies one or more of a non-interfering mode configuration rule such as the non-interfering mode configuration rules 1301 to 1308 from FIG. 13. Accordingly, a co-presence policy associates a vehicle or a vehicle type with a sensitivity level and one or more non-interfering mode configuration rules 1300. An example co-presence policy is shown in FIG. 14 and discussed briefly below.

At step 1004, the telematics device 200 obtains a vehicle type and a vehicle identifier from the vehicle asset to which the telematics device 200 is coupled. The telematics device 200 may obtain the vehicle type by inspecting broadcast traffic on the asset communication bus, such as the CAN bus 150. Alternatively, or additionally, the telematics device may obtain the vehicle type by issuing a number of requests to one or more ECUs of the vehicle to which the telematics device 200 is coupled. The telematics device 200 also obtains an identifier of the vehicle in a similar manner. For example, the telematics device 200 may obtain the VIN of a vehicle by making a request to an ECU of the vehicle and obtaining a response containing the VIN. The step 1004 may be carried out before or after the step 1002. The two steps are independent. The step 1004 may be carried out when the ignition is on for an internal combustion engine vehicle or if the vehicle is turned on for an electric vehicle (EV).

At step 1006, the administration terminal 400 sends the co-presence policy to the telematics server 300. The telematics server 300 receives the co-presence policy from the administration terminal 400.

At step 1008, the telematics device 200 sends the vehicle type and/or the vehicle identifier to the telematics server 300. The telematics server 300 receives the vehicle identifier and/or the vehicle type. The step 1008 may take place before or after the step 1006. The two steps are independent.

At step 1010, the telematics server 300 determines the co-presence policy to use for the telematics device 200. For example, the telematics server 300 may compare the vehicle type sent by the telematics device 200 and determine the appropriate sensitivity level and/or non-interfering mode configuration rules from the co-presence policy sent by the administration terminal 400 in step 1006. Alternatively, the telematics server 300 may compare a vehicle identifier provided by the telematics device 200 with the vehicle identifier specified in the co-presence policy provided by the administration terminal 400 in step 1006. If there is a match, then the telematics server 300 determines which sensitivity level and which non-interfering mode configuration rules to use with telematics device 200 coupled to the vehicle. The telematics server 300 derives a co-presence policy that is specific for the telematics device 200 from the co-presence policy that is provided by the administration terminal 400 which may contain rules and sensitivity levels for multiple vehicles and/or multiple vehicle types. For example, FIG. 14 shows a co-presence policy 1400 prepared by the telematics server 300 for use with a telematics device 200, in accordance with embodiments of the present disclosure. A description of the co-presence policy 1400 is provided below. At this point, it is sufficient to point out that the non-interfering mode configuration rules specified in the co-presence policy 1400 are a subset of the plurality of non-interfering mode configuration rules 1300 of FIG. 13.

At step 1012, the telematics server 300 sends the co-presence policy prepared for the telematics device 200, to the telematics device 200. The telematics device 200 receives the co-presence policy prepared therefor.

At step 1014, the telematics device 200 determines the presence of a second device on the vehicle communications bus in accordance with a scheme determined by the diagnostic tool detection sensitivity level specified in the policy.

Figure 15:
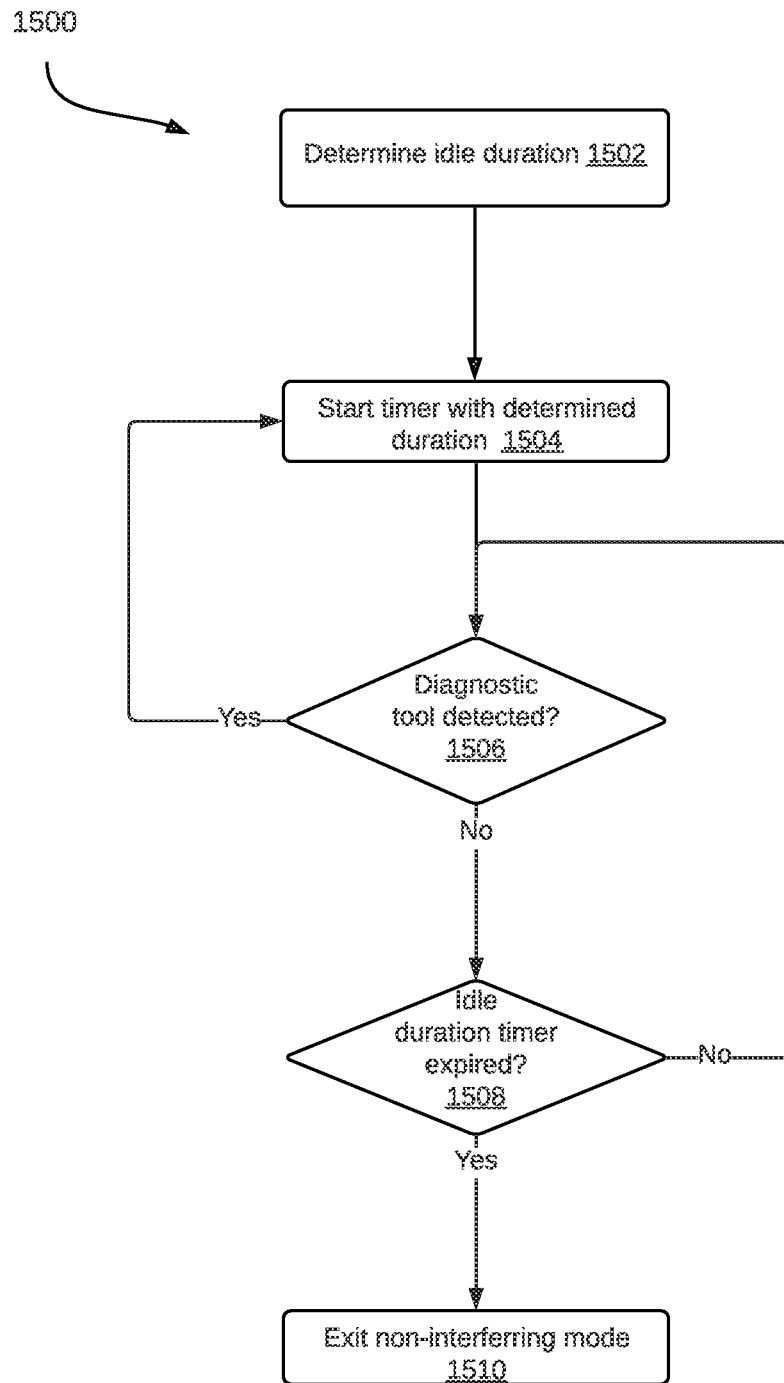
FIG. 15 is an exemplary method for exiting the non-interfering mode if not diagnostic tool is detected for a predetermined duration, in accordance with embodiments of the present disclosure.

The various diagnostic tool detection schemes are explained with reference to FIG. 15 below.

If the telematics device 200, upon executing one of the schemes for detecting the presence of a second device, determines that a second device is detected on the same asset communications bus as the telematics device 200, then step 1016 is carried out. Alternatively, if the telematics device determines that no other device is detected on the same asset communications bus, then control goes back to step 1014 where the telematics device continues to monitor for the presence of a second device using the diagnostic tool detection scheme determined by the diagnostic tool detection sensitivity level.

At step 1016, the telematics device 200 enables a non-interfering mode in accordance with the non-interfering mode configuration rules of the co-presence policy. As will be described below, the non-interfering mode configuration rules define whether a non-interfering mode is enabled based on a number of factors such as priority, whether the second device is temporarily or permanently connected, and the motion status of the vehicle.

The telematics device 200 uses one of a number of diagnostic tool detection sensitivity levels to determine whether a second device, such as a diagnostic tool, is connected to the asset communications bus to which the telematics device 200 is connected. FIG. 12 illustrates a number of diagnostic tool detection sensitivity levels 1200 in accordance with embodiments of the present disclosure. It is, however, helpful to discuss the various frames and protocols typically used on an asset communications bus, such as a CAN bus 150.

Figure 11A:
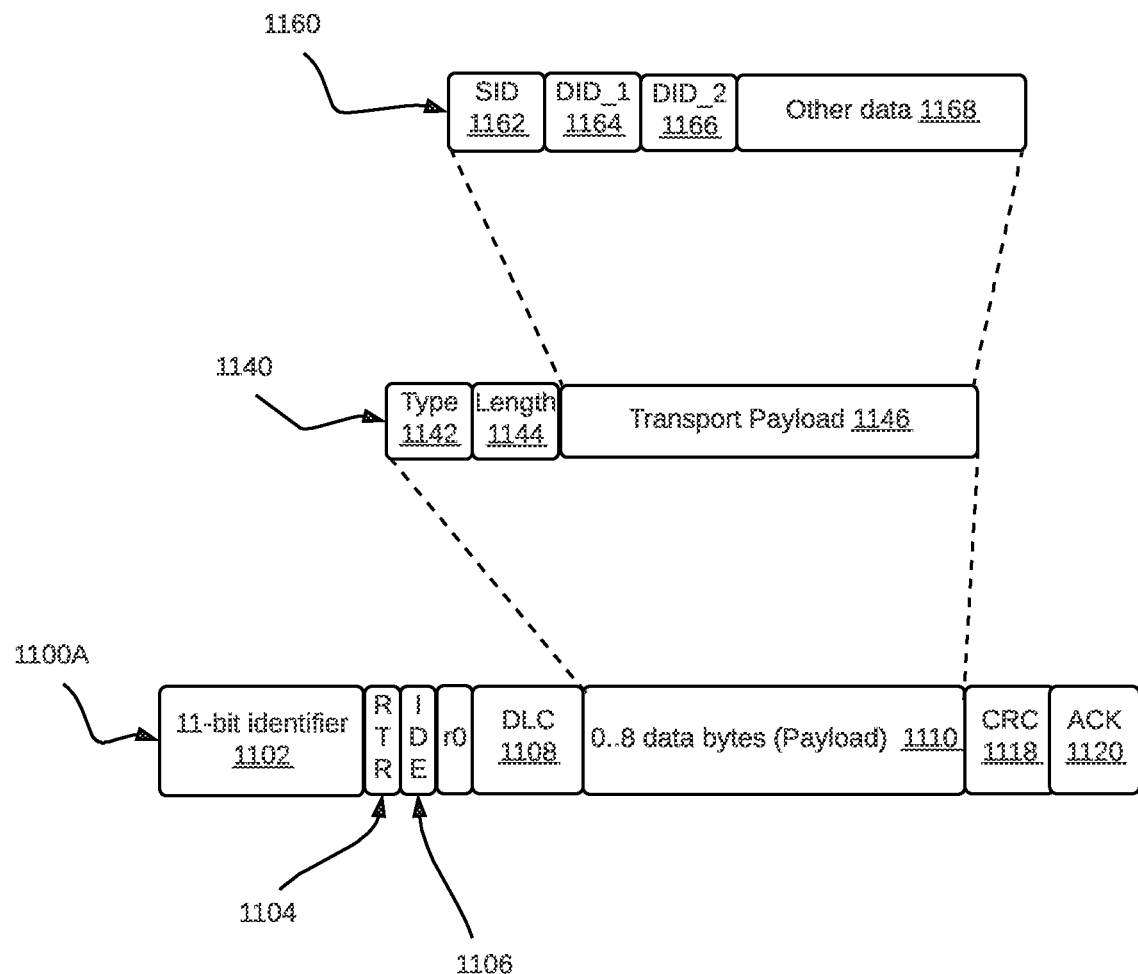
FIG. 11A is a simplified representation of a standard CAN data frame, along with a transport frame and a diagnostic frame encapsulated therein.

FIG. 11A depicts a simplified representation of frames of a number of protocols typically used by a diagnostic tool in communicating with a vehicular asset. The CAN protocol uses the network and data link layers of the ISO 7-layer model. For broadcast traffic that ECUs send on the CAN bus 150, the ECUs can use CAN frames only to place data on the CAN bus 150. For directed requests and response, a transport protocol is used and therefore a transport frame is encapsulated within a CAN frame. A diagnostic protocol sends diagnostic commands encapsulated within transport frames. FIG. 11A depicts a standard CAN data frame 1100A, a transport frame 1140, and a diagnostic frame 1160. The standard CAN data frame 1100A consists of an 11-bit CAN identifier 1102, a remote transmission request (RTR) bit 1104, and identifier extension (IDE) bit 1106, a data length code (DLC) 1108, a CAN frame payload 1110 of 8 data bytes, a CRC field 1118, and an acknowledgement (ACK) field 1120.

The 11-bit identifier field stores a CAN identifier 1102. The CAN protocol requires that all contending messages have a unique identifier. An ECU 110 typically has a CAN ID on which it receives requests and another CAN ID on which it sends responses. For example, an ECU may receive requests on CAN ID 0x750 and then provide responses using the CAN ID 0x758. In this case, a diagnostic tool or a telematics device prepares a CAN data frame containing the CAN ID 0x750 along with request data and places the CAN data frame on the CAN bus 150. Subsequently, the diagnostic tool or telematics device listens on the CAN bus 150 for a CAN frame containing the CAN ID 0x758, then examines the payload of such frame for a response to the previously sent request. More on the requests and responses will be explained below.

The RTR bit 1104 denotes a remote transmission request.

The IDE bit 1106 has a value of 0 when the CAN data frame is a standard CAN data frame with an 11-bit identifier.

Figure 11B:
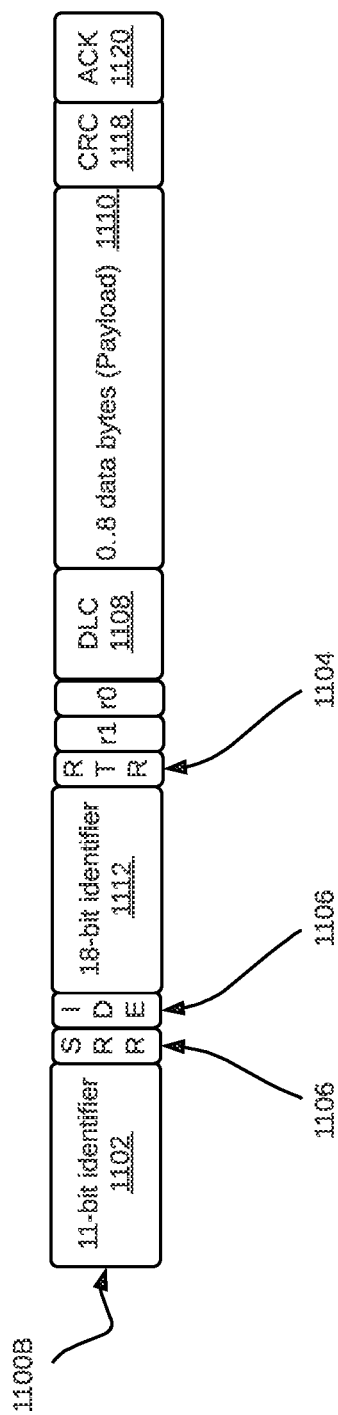
FIG. 11B is a simplified representation of an extended CAN data frame.

The IDE bit 1106 has a value of 1 when the CAN data frame is an extended CAN data frame, such as the extended CAN data frame 1100B of FIG. 11B.

The DLC 1108 indicates the length of the relevant bytes in the CAN frame payload 1110. The total length of the payload is 8 bytes; however some CAN data frames may carry fewer than 8 bytes.

The CAN frame payload 1110 is 8 bytes long and may contain either raw data, or diagnostic commands encapsulated in a transport protocol, as will be explained below.

The CRC field 1118 contains a checksum for error detection.

The ACK 1120 is set by nodes receiving an accurate CAN message.

An examination of the CAN identifier 1102 may give insight as to whether the standard CAN data frame 1100A or the extended CAN frame 1100B was sent by an ECU 110 of the asset 100, potentially by another device other than an ECU 110 of the asset 100, or by a diagnostic tool 600. In some embodiments, detecting a particular diagnostic tool entails the telematics device 200 inspecting the CAN frame payload 1110 as will be described below.

For non-broadcast data that is exchanged between an ECU 110 and a diagnostic tool or a telematics device, a transport protocol is typically used. The transport frames 1140 are encapsulated within a CAN frame in the CAN frame payload 1110 thereof. A transport frame 1140 is generally comprised of a header and a payload. The header of the transport protocol may contain both a type 1142 and a length 1144. For example, in the International Standards Organization Transport Protocol (ISO-TP), the upper nibble of byte 0 contains an indication of the type of transport frame. For ISO-TP, a type value of 0 indicates that the transport frame is a single frame and the data encapsulated in the transport payload 1146 is all the data being sent. The transport frame 1140 is encapsulated in the CAN frame payload 1110 of the CAN data frame 1110A, and the first byte of the transport frame contains a type 1142 and a length 1144. Accordingly, the payload of the transport payload 1146 may hold a maximum of 7 bytes. While this may be sufficient for many data requests, the 7 bytes may not be sufficient for some responses. In that case, the ISO-TP protocol provides for multi-frame transport of data. The first frame of a multi-frame message has a type of 1. Furthermore, the lower nibble of the type 1142 and the length 1144 contain the full size of the data being sent. In this case, the maximum size of data that can be sent by a multi-frame ISO-TP message is 4095 bytes (0x0FFF). The first frame of a multi-frame message can only carry the first 6 bytes of a multi-frame ISO-TP message. Subsequent frames of a multi-frame message have an upper nibble of 2, and a lower nibble containing a frame number between 0x0 and 0xF starting at 1 and rolling over to 0 after reaching 0xF. A flow control frame that controls whether individual frames are to be acknowledged and a time duration between subsequent frames has a type of 3. Furthermore, a flow control frame has 2 bytes specifying the flow control and duration. Another variation of the ISO-TP is the BMW-TP which includes an additional byte in byte position 0, the additional byte being the low byte of the response CAN ID that the particular ECU is to use for the response.

The aforementioned properties of the transport protocols may be used by the telematics device 200 to determine whether a CAN data frame is a broadcast frame sent by an ECU or a request frame sent by a diagnostic tool requesting information from an ECU. This will be explained further below.

Specific diagnostic protocols exist for querying the ECUs 110 requesting specific data or for configuring an ECU in a particular mode. Examples of diagnostic protocols include OnBoard Diagnostic (OBD), Unified Diagnostic Services (UDS) and the keyword protocol (KWP). A diagnostic frame 1160 typically has a service identifier (SID) 1162 which specifies the diagnostic service requested from an ECU, along with one or more data identifier (DID), such as DID_1 (shown as field 1164) and DID_2 (shown as field 1166). A diagnostic frame 1160 may also contain other data 1168. A diagnostic request frame is typically short enough (such as 3 bytes) and may therefore be sent in the transport payload 1146 of a single frame transport protocol message. Since the transport payload 1146 of a single frame transport message is 7 bytes, the diagnostic request may be 7 bytes long which is generally enough to specify a service, and a number of DIDs. The diagnostic response typically contains more than 7 bytes and therefore is usually spread over a multi-frame transport message.

As a variation of the CAN data frame, an extended CAN data frame has an 11-bit CAN identifier 1102 and an extended 18-bit CAN identifier 1112 thus forming an extended 29-bit CAN identifier ("extended CAN ID"). A substitute remote request (SRR) bit replaces the RTR. For an extended CAN data frame, the IDE bit is set.

The co-presence policy sent by the telematics server 300 to the telematics device 200 contains at least one diagnostic tool detection sensitivity level. The diagnostic tool detection sensitivity level configures the telematics device 200 to check one or more of: the CAN data frame, the transport frame, and the diagnostic request message. FIG. 12 shows a table of a plurality of diagnostic tool detection sensitivity levels 1200 that a telematics device 200 may use to determine a detection scheme for use in detecting another device on the same asset communications bus as the telematics device 200. It should be restated that the co-presence policy may be specified for a specific vehicle or a specific vehicle type. Accordingly, the sensitivity level specified may be tailored to a particular vehicle type. In some embodiments, the telematics server 300 may contain logic or rules for automatic selection of the sensitivity level based on vehicle type, for example.

The sensitivity level 1201 is the most sensitive of all diagnostic tool detection levels. The sensitivity level 1201 configures the telematics device 200 to check the CAN identifier 1102 of CAN frames and check whether the CAN ID has a value that is not typically sent by an ECU in broadcast mode. For example, the telematics device may maintain a list of typical broadcast CAN IDs and may compare the CAN ID of each standard CAN data frame 1100A or extended CAN ID for each extended CAN data frame 1100B placed on the CAN bus with the CAN IDs maintained in the typical broadcast CAN IDs. If the telematics device 200 detects a CAN frame with an identifier (CAN ID or extended CAN ID) that does not match the list of typical broadcast CAN IDs, the telematics device 200 determines the presence of another device on the CAN bus. Selecting this sensitivity level may lead to the telematics device 200 enabling a non-interfering mode in some situations where it may not be necessary, but errs on the side of caution.

The sensitivity level 1202 configures the telematics device 200 to check the CAN identifier 1102 of CAN frames and check whether the CAN ID (or extended CAN ID) has a value that is typically used to request information from engine and powertrain ECUs. For example, in many vehicles a diagnostic tool may request specific information from address ranges of 0x7DF to 0x7E7. In other examples, the extended 29-bit CAN ID of 0x18DB33F1 is used by a diagnostic tool to request information from one or more ECUs. The extended CAN ID contains the source address of the device which created the frame. In the aforementioned example, the source address is 0xF1 which is typically used by a diagnostic tool. In some cases, a range of consecutive extended CAN IDs are used by external diagnostic tools as well. Some OEM-specific diagnostic tools use specific extended CAN IDs and may therefore be detected by comparing the extended 29-bit CAN ID of CAN frames placed on the bus with the OEM-specific diagnostic tool CAN ID.

Some OEM-specific diagnostic tools use a standard (11-bit) CAN ID that is unique thereto. However, coincidentally that same CAN ID may be used by other vehicles to send broadcast CAN traffic. In such cases, the telematics device 200 needs to check both the CAN ID and the vehicle type before concluding the presence of the diagnostic tool. The sensitivity level 1203 checks for specific CAN IDs and also for a vehicle type. For example, when the telematics device 200 first initiates communication with the vehicle, the telematics device 200 may detect a sequence of bytes, known as a signature, that identifies the vehicle type. Additionally, or alternatively, the telematics device 200 may initially send some diagnostic requests to the vehicle to obtain the vehicle type. In all cases, the OEM-specific diagnostic tool CAN ID and the vehicle type together determine whether a diagnostic tool has been detected. If the OEM-specific diagnostic tool CAN ID is detected by the vehicle type and does not match the OEM vehicle type, then the telematics device 200 does not determine that the OEM-specific diagnostic tool has been detected.

Occasional false positives detection of a diagnostic tool if a vehicle contains one or more ECUs that broadcast frames with CAN IDs similar to the CAN IDs typically used by diagnostic tools. In order to reduce the false positives, the telematics device 200 may check the CAN frame payload 1110 to determine whether it contains a transport protocol frame such as ISO-TP. If the CAN frame payload 1110 contains a transport protocol frame, then the CAN frame containing the CAN ID that is suspected to correspond to a diagnostic tool was most likely sent by the diagnostic tool and is not a broadcast frame. This is the behavior employed by the telematics device when the sensitivity level is set to the sensitivity level 1204. When the sensitivity level is set to a sensitivity level 1204, the telematics device 200 checks the CAN frame payload 1110 for signs that a transport protocol such as ISO-TP is encapsulated therein. For example, if byte 0 of the payload 1110 has an upper nibble that is greater than 3, then the CAN data frame is not a directed frame containing an ISO-TP transport frame. This is because, as discussed above, the upper nibble of byte 0 of an ISO-TP frame can only contain values from 0 to 3. Another check which may be performed is to check the lower nibble of byte 0. If the upper nibble of byte 0 is 0x0, then the lower nibble contains the length of the ISO-TP payload which has to be less than 7. If the upper nibble of byte 0 is 0x3, indicating a flow control frame, then the lower nibble has to contain either 0, 1, or 2. Such checks may be performed to ascertain that the CAN data frame is a directed frame and therefore was sent by a diagnostic tool and not a broadcast CAN data frame that coincidentally uses the same CAN ID as a diagnostic tool does.

The strictest diagnostic tool detection sensitivity level is the sensitivity level 1205. The sensitivity level 1205 ascertains that a received CAN data frame has a CAN ID typically used by a diagnostic tool, contains a transport frame, and also contains a diagnostic message or command within the transport frame. In other words, the telematics device 200 performs the same checks as the sensitivity level 1204 with the addition of checking for specific diagnostic commands. For example, the telematics device 200 checks the transport payload 1146 for a diagnostic message having a SID 1162 that is normally sent by a diagnostic tool. One example of a diagnostic message is the tester present service from the UDS protocol, or the diagnostic session control service also from the UDS protocol. With a strict sensitivity level such as the sensitivity level 1205, the telematics device 200 determines a co-presence of a diagnostic tool only when specific diagnostic commands are detected. These commands are chosen as they represent typical tasks being performed that would be jeopardized if the telematics device 200 was to send requests on the CAN bus.

As discussed, a plurality of non-interfering mode configuration rules configure the telematics device 200 to either continue normal operation or enter into a non-interfering mode in response to detecting the presence of a second device, such as a diagnostic tool, on the asset communications bus. The rules may be stored on the telematics server 300 or, as discussed earlier, provided by a fleet manager using an administration terminal 400. It should be noted that when the telematics device 200 is in a non-interfering mode, the asset data 112 gathered is significantly reduced as much of the asset data 112 is gathered by sending requests to specific ECUs. The loss in asset data 112 is balanced, by the non-interfering mode configuration rules 1300, against the potential for interference between the telematics device 200 and the other device. Different applications and scenarios need different rules. The non-interfering mode configuration rules 1300 are by no means exhaustive. Some permutations are not listed for simplicity and brevity.

FIG. 13 shows a plurality of non-interfering mode configuration rules 1300. Each of the rules comprises a tool status, a motion status, a priority, and an action. The tool status is either temporary or permanent and it indicates that the particular rule is for a temporarily connected diagnostic tool. The motion status indicates that the particular rule is for a telematics device coupled to a vehicle that is either stationary or in motion (i.e., moving). The priority specifies which device takes precedence in using the asset communications bus based on the tool status and the motion status. The action field specifies the action that is triggered based on the priority field.

Some of the non-interfering mode configuration rules 1300 shown take into consideration whether the second device detected on the asset communications bus is temporarily connected or permanently connected. For example, The non-interfering mode configuration rules 1301, 1302, 1303 and 1304 may be invoked when the telematics device 200 detects the presence of a diagnostic tool on the asset communications bus and also determines that the diagnostic tool is temporarily connected. Conversely, the rules 1305, 1306, 1307 and 1308 are only invoked by the telematics device 200 in response to determining that the diagnostic tool detected is permanently connected to the asset communications bus, such as the CAN bus 150. The manner in which the telematics device 200 determines whether a device present on the asset communications bus is temporarily or permanently connected is explained further below.

Some of the non-interfering mode configuration rules 1300 consider the motion status of the vehicle, and hence the motion status of the telematics device 200. Other rules may ignore the motion status. For example, the non-interfering mode configuration rules 1301 and 1302 ignore the motion status of the vehicle. Accordingly, with reference to the non-interfering mode configuration rule 1301 if a temporarily connected device is detected on the asset communications bus, the telematics device shall operate normally and is prioritized over the temporarily connected device. In some embodiments, there may be some exceptions to this rule, such as the detection of some critical diagnostic services. For example, if the telematics device 200 detects some diagnostic frames indicating that a firmware upload was initiated, the telematics device 200 may enter a non-interfering mode until the telematics device 200 detects another diagnostic frame indicating the conclusion of the firmware upload. With reference to the rule 1302, regardless of the motion status of the vehicle, the detection of a temporarily connected tool causes the telematics device 200 to enter into a non-interfering mode.

The rules 1303 and 1304 configure the telematics device 200 into a non-interfering mode only if the vehicle to which the telematics device 200 is coupled is stationary. If the vehicle is in motion, the telematics device 200 operates normally. These two rules prioritize the diagnostic tool only when the vehicle may be undergoing a particular test while it is stationary. When the vehicle is in motion, the telematics device 200 becomes a priority and continues operating normally.

For a permanently connected other device on the same communications bus as the telematics device 200, the rules 1305 through 1308 prioritize either the telematics device or the other device depending on a priority and also depending on the motion status of the vehicle. For example, the rule 1305 is invoked when the second device detected is permanently connected and the vehicle is stationary. The priority setting requires that the telematics device 200 has a lower priority than the diagnostic tool when the vehicle is stationary. In this case, the telematics device goes into a non-interfering mode. The rule 1306, however, is invoked when the vehicle is in motion and a permanent device is detected. In this case, the telematics device 200 goes into a non-interfering mode. The rules 1305 and 1306 are essentially a single rule but are shown with both conditions for clarity. In other words, if the vehicle is stationary, the diagnostic tool takes precedence, whereas if the vehicle is in motion the telematics device 200 takes precedence.

The rules 1307 and 1308 are the opposite of the rules 1305 and 1306. The rules 1307 prioritize the telematics device 200 if the vehicle is stationary and prioritize the other device (e.g., the diagnostic tool), if the vehicle is in motion.

FIG. 14 shows an example of a co-presence policy 1400 used to control the telematics device 200 for detecting another device and for activating a non-interfering mode. The co-presence policy 1400 has a diagnostic tool detection sensitivity level field 1410 and a plurality of non-interfering mode configuration rules 1420. In the co-presence policy 1400, the checking of a second device is configured in the strict mode wherein the determination that a second device is present on the asset communications bus is made when both a CAN identifier (at the network and data link layers) that is not corresponding to a known ECU and a diagnostic message are detected. The policy also includes the rules 1303, 1304, 1305 and 1306 described above. The rules 1303 and 1304 are essentially a single rule shown with both possible vehicle motion status for clarity. Similarly, the rules 1305 and 1306 are a single rule shown with both possible vehicle motion status for clarity.

As mentioned above, when the telematics device 200 is in a non-interfering mode, the telematics device refrains from issuing any requests on the asset communications bus, such as the CAN bus 150. This leads to loss of asset data 112. Accordingly, the telematics device 200 may periodically check whether the conditions that triggered entering the non-interfering mode still apply. This check is done periodically while the telematics device is in a non-interfering mode. If a period of time passes without the telematics device detecting the diagnostic tool using whatever method it is configured to use, the telematics device 200 reverts back to normal operation where it may send requests on the CAN bus. FIG. 15 depicts a method 1500 of operating a telematics device 200 in the non-interfering mode and exiting the non-interfering mode if no diagnostic tool is detected for a period of time termed an idle duration.

The method 1500 assumes that the telematics device 200 is already in a non-interfering mode entered in accordance with step 908 of the method 900 of FIG. 9. The method 1500 starts at step 1502. At step 1502, the telematics device 200 determines an idle duration to use for periodically checking whether a diagnostic tool is still connected to the vehicle bus. We refer to this duration as the idle duration as it is the duration during which if a detection tool does not place any frames on the CAN bus, it is considered idle or off.

At step 1504, the telematics device 200 starts a timer with the idle duration determined in step 1502.

At step 1506, the telematics device 200 checks whether a diagnostic tool has been detected on the same asset communications bus, in accordance with a current diagnostic tool detection sensitivity level. If a diagnostic tool is detected, then control goes back to step 1504 and the timer is restarted. For example, if the timer was initially set for 10 minutes, and after 3 minutes a diagnostic tool is detected, the timer is reset back to 10 minutes. This ensures that the telematics device 200 will not return to normal operation where it may be sending requests on the asset communications bus, because of a pause in the operation of the diagnostic tool. Rather, the diagnostic tool must have ceased all activity for the full duration of the timer before the telematics device 200 may determine that the diagnostic tool has been turned off or has been disconnected. If no diagnostic tool is detected at step 1506, then control goes to step 1508.

At step 1508, the telematics device 200 checks whether the timer has expired. If the timer is still running, then control goes back to step 1506 to check whether a diagnostic tool can still be detected. On the other hand, if the timer has expired without detecting any activity indicating the presence of the diagnostic tool, then control goes to step 1510.

In some embodiments, the idle duration depends on the diagnostic tool detection sensitivity level. For example, if a high sensitivity level is used, there is a desire to refrain from going back to normal mode of operation frequently. In this case a long idle duration, such as 10 minutes is used. As another example, if a strict or low-sensitivity level method is used to detect the diagnostic tool, there is a high degree of confidence that the diagnostic tool was detected and the telematics device 200 may try to return to normal operation more frequently. As such the idle duration is chosen to be short, such as 1 minutes or 30 seconds.

In some embodiments, the diagnostic tool status determines the idle duration. For example, if a temporary diagnostic tool is connected, the telematics device 200 may use a large idle duration as the diagnostic tool is expected to be using the CAN bus for a limited period of time. If, however, the tool is permanently connected, the telematics device uses a short idle duration as it is desirable to return to normal operation as frequently as possible to avoid loss of asset data.

In some embodiments, the idle duration depends on the motion status of the vehicle to which the telematics device 200 is coupled. For example, a long idle duration may be used when the telematics device 200 determines that the vehicle is stationary. The telematics device 200 gathers more interesting information when the vehicle is in motion. Accordingly, when the vehicle is stationary a long idle duration is appropriate. When the vehicle is in motion, as detected by a motion sensor of the telematics device 200, then a shorter idle duration is used to check more frequently if a diagnostic tool is still connected. Using a shorter idle duration means that the telematics device may return to normal operation more quickly thus reducing the loss of asset data 112.

The non-interfering mode configuration rules 1300 may assign different priorities to the telematics device 200 and the diagnostic tool depending on whether the diagnostic tool is temporarily or permanently connected to the vehicle. In some embodiments, the telematics device 200 may maintain a log of diagnostic tool detection events and based on said log may determine whether a tool is permanently or temporarily connected to the asset communications bus. For example, when a diagnostic tool has been detected (n) successive times each time after an ignition event may be treated as a permanently detected tool. In other embodiments, the telematics device 200 may determine that a diagnostic tool is a permanently connected diagnostic tool if the telematics device 200 detects activity from the diagnostic tool while the vehicle is in motion.

Advantageously, the methods described herein allow for gathering asset data from assets, such as vehicles while averting or minimizing interference with a diagnostic tool connected to the asset communications bus.

Embodiments have been described where the techniques are implemented in circuitry and/or computer-executable instructions. It should be appreciated that some embodiments may be in the form of a method or process, of which at least one example has been provided. The acts performed as part of the method or process may be ordered in any suitable way. Accordingly, embodiments may be constructed in which acts are performed in an order different than illustrated, which may include performing some acts simultaneously, even though shown as sequential acts in illustrative embodiments. Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments

The invention claimed is:

1. A method by a telematics device connected to an asset communications bus of an asset, the method comprising:
   receiving a co-presence policy from a telematics server;
   receiving asset data from the asset;
   determining a presence of a second device on the asset communications bus based on the co-presence policy; and
   activating a non-interfering mode of operation based on determining the presence of the second device and on the co-presence policy;

wherein the co-presence policy comprises a sensitivity level;
wherein receiving asset data comprises receiving at least one Controller Area Network (CAN) frame from the asset; and
wherein determining the presence of the second device comprises checking for at least one identifier in the CAN frame in accordance with the sensitivity level.

2. The method of claim 1, wherein checking for at least one identifier in the CAN frame comprises checking for a CAN identifier that is not a typical broadcast CAN ID.

3. The method of claim 1, wherein checking for at least one identifier in the CAN frame comprises checking for one of a plurality of CAN frames known to be used by diagnostic tools.

4. The method of claim 1, wherein checking for at least one identifier in the CAN frame comprises checking for a specific CAN identifier used by a diagnostic tool corresponding to a specific asset type, and the method further comprises determining that the asset to which the telematics device is coupled is of the specific asset type.

5. A method by a telematics device connected to an asset communications bus of an asset, the method comprising:
receiving a co-presence policy from a telematics server;
receiving asset data from the asset;
determining a presence of a second device on the asset communications bus based on the co-presence policy; and
activating a non-interfering mode of operation based on determining the presence of the second device and on the co-presence policy;
wherein the co-presence policy comprises a sensitivity level;
wherein receiving asset data comprises receiving at least one Controller Area Network (CAN) frame from the asset; and
wherein determining the presence of the second device comprises checking for at least one identifier in the CAN frame in accordance with the sensitivity level and detecting a transport frame within the CAN frame.

6. The method of claim 5, wherein determining the presence of the second device further comprises detecting at least one diagnostic message within the transport frame.

7. The method of claim 6, wherein the at least one diagnostic message comprises a unified diagnostic services (UDS) message selected from the group consisting of: a session control service and a tester present service.

8. A method by a telematics device connected to an asset communications bus of an asset, the method comprising:
receiving a co-presence policy from a telematics server;
receiving asset data from the asset;
determining a presence of a second device on the asset communications bus based on the co-presence policy; and
activating a non-interfering mode of operation based on determining the presence of the second device and on the co-presence policy;
wherein the co-presence policy comprises at least one non-interfering mode configuration rule; and
wherein the at least one non-interfering mode configuration rule causes the telematics device to operate normally or to enter a non-interfering mode based on at least one of a tool status, a motion status and a priority.

9. The method of claim 8, wherein the tool status indicates whether the presence of the second device on the asset communications bus is temporary or permanent.

10. The method of claim 8, wherein the motion status indicates whether the asset is stationary or moving.

11. The method of claim 8, wherein the priority determines whether the telematics device should be prioritized over the second device, or the second device should be prioritized over the telematics device.

12. The method of claim 11, wherein the priority is based on at least one of the tool status and the motion status.

13. A method by a telematics device connected to an asset communications bus of an asset, the method comprising:
receiving a co-presence policy from a telematics server;
receiving asset data from the asset;
determining a presence of a second device on the asset communications bus based on the co-presence policy; and
activating a non-interfering mode of operation based on determining the presence of the second device and on the co-presence policy;
wherein the non-interfering mode of operation comprises a requests-blocked mode in which the telematics device refrains from sending requests on the asset communications bus.

14. A method by a telematics device connected to an asset communications bus of an asset, the method comprising:
receiving a co-presence policy from a telematics server;
receiving asset data from the asset;
determining a presence of a second device on the asset communications bus based on the co-presence policy;
activating a non-interfering mode of operation based on determining the presence of the second device and on the co-presence policy; and
exiting the non-interfering mode of operation in response to not determining the presence of the second device on the asset communications bus for a predetermined duration.

15. A telematics device, comprising:
a controller;
an asset interface coupled to the controller, the asset interface for connecting the telematics device to an asset communications bus of an asset;
a network interface coupled to the controller;
a memory coupled to the controller, the memory storing machine-executable programming instructions for configuring the telematics device to:
receive, over the network interface, a co-presence policy from a telematics server;
receive, over the asset interface, asset data from the asset;
determine a presence of a second device on the asset communications bus based on the co-presence policy;
activate a non-interfering mode of operation based on determining the presence of the second device and on the co-presence policy; and
exit the non-interfering mode of operation in response to not determining the presence of the second device on the asset communications bus for a predetermined duration.

16. The telematics device of claim 15, wherein the co-presence policy comprises a sensitivity level.

* * * * *